(12) United States Patent
Davis

(10) Patent No.: US 9,519,047 B2
(45) Date of Patent: Dec. 13, 2016

(54) SYSTEM AND METHOD OF IMPLEMENTING ASYNCHRONOUSLY-CLOCKED FIXED-LOCATION DEVICES FOR A DISTANCE DETERMINATION BY A ROAMING CLIENT DEVICE

(71) Applicant: Kerry L. Davis, San Jose, CA (US)

(72) Inventor: Kerry L. Davis, San Jose, CA (US)

( * ) Notice: Subject to any disclaimer, the term of this patent is extended or adjusted under 35 U.S.C. 154(b) by 500 days.

(21) Appl. No.: 14/216,231

(22) Filed: Mar. 17, 2014

(65) Prior Publication Data

US 2014/0304351 A1 Oct. 9, 2014

Related U.S. Application Data

(60) Provisional application No. 61/808,117, filed on Apr. 3, 2013.

(51) Int. Cl.
*G01S 3/02* (2006.01)
*G01S 5/10* (2006.01)

(52) U.S. Cl.
CPC ........................ *G01S 5/10* (2013.01)

(58) Field of Classification Search
CPC ..................... G01S 3/02; G01S 5/10
USPC ........................................................ 342/458
See application file for complete search history.

(56) References Cited

U.S. PATENT DOCUMENTS

| | | | |
|---|---|---|---|
| 2013/0016649 A1* | 1/2013 | Damnjanovic | H04W 88/04 370/315 |
| 2013/0021932 A1* | 1/2013 | Damnjanovic | H04W 52/0229 370/252 |

\* cited by examiner

*Primary Examiner* — Harry Liu

(57) ABSTRACT

A system of asynchronously-clocked fixed-location devices and a roaming client device can be used for a distance determination of the roaming client device. The system includes a master device, at least one slave device, and any number of roaming client devices. The master device transmits a series of pulses. Once those pulses reach the client device, the client device will begin to count the number of pulses. Once those pulses reach the slave device, the slave device will transmit an acknowledgement pulse. After the client device receives the acknowledgement pulse, the client device will stop counting the pulses from the master device. The total number of pulses counted by the client device will then be used in the distance determination of the client device.

9 Claims, 39 Drawing Sheets

SYSTEM AND METHOD OF IMPLEMENTING ASYNCHRONOUSLY-CLOCKED FIXED-LOCATION DEVICES FOR A DISTANCE DETERMINATION BY A ROAMING CLIENT DEVICE

The current application claims a priority to the U.S. Provisional Patent application Ser. No. 61/808,117 filed on Apr. 3, 2013.

FIELD OF THE INVENTION

The present invention is in the technical field of determining a difference in distance (DiD) measurement using asynchronous elements and distance counting that is equivalent to the more common method of time difference of arrival (TDOA) measurements requiring synchronous elements to determine 2-dimensional (2D) and 3-dimensional (3D) positioning. More specifically, the present invention is in the technical field of determining the difference in distance traveled of signals sent from asynchronous statically positioned transmitters of known position to an asynchronous mobile roaming receiver of unknown position in order to determine the 2D or 3D position of the mobile receiver relative to the statically positioned domain transmitters.

BACKGROUND OF THE INVENTION

TDOA is a measurement of the difference in arrival time of two signals originating simultaneously (synchronously in near absolute time) from two different known positions to a common unknown position in space or is the measurement in difference of arrival time of a common single signal of unknown origin to two different known locations in space. This information is valuable in the field of location positioning when the signal velocities are known and/or predictable and are constant and are used to determine the distances between the three objects mentioned above.

TDOA can make use of wired or wireless signals. Most commonly, these consist of light, radio, electrical voltage differentials, or sound transported via waves, particles, pulses and packets, or any combination thereof. TDOA is particularly useful to multilateration algorithms, where a series of TDOA values, along with known positions for the signal originators being timed, define a set of intersecting hyperbola in 2D space and hyperboloids in 3D space. Three intersecting hyperboloids can be used to give a precise 3D coordinate location but only if the individual TDOA values used to define the hyperboloids are accurate.

TDOA is only useful for positioning when it can be related to the distance, or more specifically, the difference in distances, between an object of unknown position to two objects of known position. For this reason, the origin of signals from/to the two objects of known position used for TDOA measurements must be brought into time synchronization to a useful resolution to make location possible. Typically, this is done by synchronizing the objects of known position and quite often the mobile object of unknown position, to a common time reference so that the TDOA can be directly related to the difference in distances between the mentioned objects. Synchronization of these elements is not only very expensive but, especially in the case where the signals are traveling at the speed of light and being received by the mobile object of unknown position, requires that the mobile be capable of differentiating the two arrival times at a very high precision and resolution in order for the positioning information to be useful for most client aware applications.

The signal being used must also be of a consistent or predictable velocity. Sound for instance, although generally consistent in velocity at any particular moment, travels through air at significantly different rates depending on the current ambient temperature. However, this variation in velocity for sound at different ambient air temperatures can be compensated for and predictable for short periods of time.

The primary use of TDOA and the resulting conversion to Di is for real-time location systems (RTLS). It can be in a server aware or client aware location environment or possibly both. Examples of a server-aware environment may be the centralized tracking of expensive hospital equipment to room level resolution or tracking a tool tagged to broadcast a signal giving its position. In server-aware scenarios, the client is not necessarily aware of its position. Nokia has developed a server aware positioning system recently using Bluetooth 4.0 antenna arrays and triangulation techniques for example. One downfall of an exclusive server-aware positioning environment is that there is always a limit as to the number of clients that can be tracked.

Client-aware positioning systems are systems in which the mobile client is aware of its position within the domain. A popular example of a client-aware positioning system would be a global positioning service (GPS) device made by companies for automotive guidance using the GPS satellites currently in orbit over the Earth today. The client may choose to reveal its position to a server to form a combined client/server-aware positioning system, but it would not be required to determine the client's position.

RTLS systems today are very expensive, bulky, and complicated. They typically require some type of system level clock synchronicity, which must be distributed and maintained to the mobile device. This can take a lot of time for the user and is very expensive to design-in on both the server side and the client side. In some markets, like the GPS market, this is easily offset by the scale of deployment and the number of users. Still in other markets these problems form a barrier to entry, especially in the very lucrative local/indoor client aware positioning market. Power requirements, distribution, mobile footprint, standards compliance, device HW penetration, multipath reflection, installation, and calibration are factors that drive cost of ownership and affect market adoption for the client-aware local real-time location market.

Ultra-wideband (UWB) pulse radios are widely being researched at present for their very short pulse duration and, therefore, for their ability to both avoid multipath reflection issues and, in moderation, avoid interference with common narrow, wide, and broadband frequency communications including Wi-Fi and Bluetooth. Unfortunately, most applications using UWB pulses for location and ranging, still require very high resolution timing and experience difficulty detecting the leading edge of the pulse to get an accurate time stamp.

While TDOA of synchronized signals is commonly used as a method for finding the DiD needed for multilateration to work, it is not the only method. It is possible, as the present invention will prove, to actually calculate more directly, the DiD rather than an equivalent difference in time which must then be converted to a distance. The present invention is a method for determining the DiD between an object of unknown location and two objects of known location. It requires no long term network-wide synchronization between client devices and the positioning domains infrastructure and seeks to significantly improve on the existing barriers to the market mentioned in the above background statement by simplifying the method for determining an equivalent measurement to TDOA.

Since the method of the present invention is effectively equivalent to the more common method of synchronous TDOA determination, it is often referred to as asynchronous TDOA determination in this disclosure.

SUMMARY OF INVENTION

The method for determining a DiD to a roaming object, where all elements in the domain are asynchronous of each other with the exception of very momentary phase locked timing between master and slave elements only, consists of three distinct network elements: a single master pulse transmitter, one to three slave transceivers, and any number of client roaming devices.

Simply put, a master pulse generator sends out a steady pulse which is first phased locked by all slaves independently of each other. Once phase locked, the slaves acknowledge the master pulse in phased intervals, not to the master, but rather back to all clients in the domain. The client devices in the mean time are simply counting and accumulating master pulses until an acknowledgment is received by each slave. A slave acknowledgement forces the client to latch the current count into the appropriate accumulator for that particular slave. Each slave acknowledges at a different phase increment for each master pulse series until all defined phase increments between 0 and 360 degrees are accumulated by each client. This process improves location resolution for each pass.

Now in more high level detail for the present invention, the Master pulse generator element is responsible for producing a steady stream of very short pulses at intermittent intervals which cover twice the distance of the entire positioning domain giving the furthest slave time to acknowledge back the full extent of the domain. The Master pulse generator is a transmitter only device and operates completely autonomous to the other network elements. A single Master element is present in the domain however, multiple domains may coexist adjacent to one another.

The function of slave transceiver elements is to phase lock (PLL) to the incoming stream of master pulses and provide a single acknowledgment. However, this acknowledgement is not intended for the master but rather for the client elements. The slave can be provisioned to acknowledge in phase with the master (thus the PLL) or in an out of phase progression between 0 and 360 degrees at particular phase intervals. One to three (or more) slaves will exist in the domain in order to achieve 3-dimensional (x,y,z) Cartesian coordinate location by the roaming mobile device and relative to the master transmitter and domain slave transceivers.

The function of the client receivers is to count master pulses until an acknowledgement is received from a slave element. When slave elements are set to respond with multiple phase shifts, the client(s) will accumulate these counts until all phase shifts are acknowledged individually by their respective corresponding slave elements. Unlimited client elements may operate within the domain. The raw counts can then easily be converted to differences in distance by multiplying the phase resolution in distance traveled between phased pulses by the number of counts collected less the time to phase lock over each pass.

Multiphase passes are required only to increase difference in distance resolution since the measured resolution is limited to the distance between received Master pulses. Phase shifts in the slave acknowledgement therefore serve to increase the resolution of the difference in distance over multiple passes. This allows for less expensive components and helps eliminate multipath issues over each pass.

The dependencies of the present invention include: A client element is dependent on both the master element and slave elements; the slave element(s) are independent of the client elements but dependent on the single master pulse transmitter element. The master pulse transmitter element is independent and therefore autonomous of both the slave and client elements.

DEFINITIONS AND ACRONYMS

Figure 1:
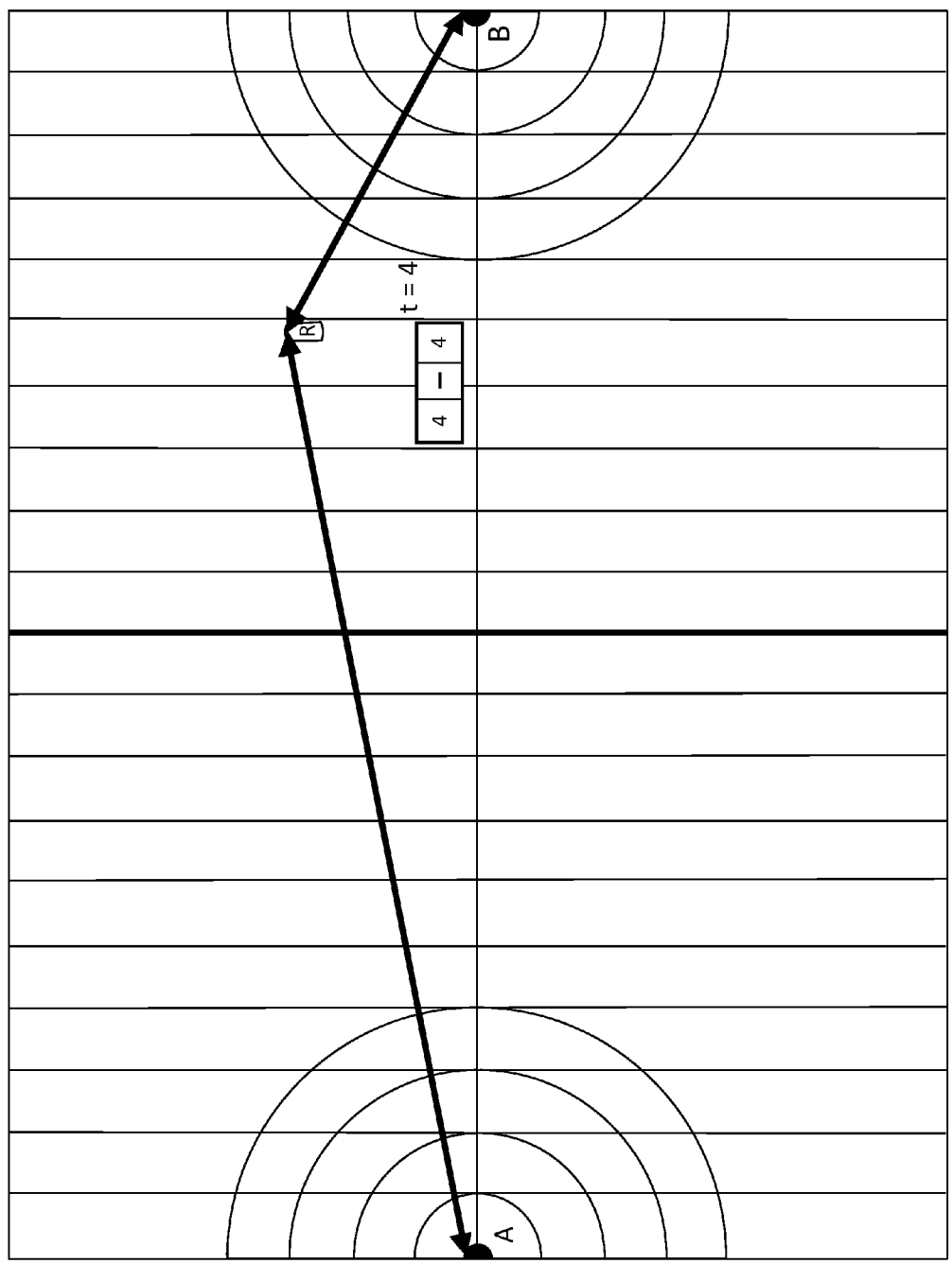
FIG. 1 is a two-dimensional drawing of a typical real time location domain with two synchronized emitters of known position and a single mobile device of unknown position at a system time "T=4" relative to the initiation of TDOA determination.

Master Device—A fixed-position transmit-only infrastructure device providing domain pulse stream and single system clock.

Slave Device—A fixed-position transceiver infrastructure device providing a phased acknowledgement pulse to the phase-locked master pulse stream to all clients.

Client Device—A roaming device capable of counting and accumulating pulses from the master device until receiving an associated acknowledgment pulse from the slave device.

Real Time Location System (RTLS) Domain—Any area within reception of both the series of pulses from the master device and all acknowledgment pulses necessary to get a fixed position for the client device relative to the master device.

Personal Computer (PC)—Windows based personal laptop computer with 3 or more USB ports supporting provisioning and monitoring software for this device.

Pulse—A pulse for this purpose is a very short radio frequency (RF) impulse signal of 20%-40% duty cycle over the pulse transmit interval. It may be ultra-wideband or a unique set of narrow band frequencies in the open broadcast range.

Pulse Recognition—The client device must take relatively the same amount of time to recognize a pulse from either the master device or the slave device with less than 20-picosecond (ps) jitter. Furthermore, the client device must also recognize a slave pulse and a master pulse with as little jitter. For instance, if a slave pulse is known to take longer to recognize than a master pulse, then an adjustment at the slave device should be made to send the slave pulse earlier in order to compensate for this. In other words, it is very important that slave acknowledgement pulses arrive and are recognized by the client device with the intended phase variance relative to the phase-locked master pulse stream.

Pulse Transmit Duration (PTD)—A provisioned value in the device in terms of microseconds (μs) that governs the total duration of active pulse transmission by a master device at a particular pulse transmit rate. This value will be available to both the slave and client devices, and the slave and client devices will know implicitly the end of a PTD by the extended duration between pulses. The slave and client devices do not need to time the PTD from beginning to end.

Pulse Transmit Rate (PTR)—A provisioned value in the device in terms of megahertz (MHz) which governs the steady rate at which a master device transmits RF pulses. Range should be at least 100 MHz to 1 GHz in 100-MHz increments.

Pulse Width (PW)—The timed interval while the pulse transmitter is active (on). Optimally, the PW is 200 ps or less, but the PW can be 1 to 1.6 nanoseconds (ns), although these larger values begin to affect the PTR.

PTI (Pulse Transmit Interval)—The complete transmitter on/off time (i.e. duty cycle) for a single pulse transmission. This value is inherent to the PTR and the PW and is computed from thereof.

Pulse Sleep Duration (PSD)—A provisioned value in the device in terms of PTI counts which governs how long the transmitter is off between PTD's. This value must be at least 4 PTI's.

Pulse Transmission Cycle (PTC)—The PTD plus the PSD comprise a single PTC.

Phase Increment (PI)—A provisioned value in the device in terms of degrees. The amount of phase adjustment repetitively and increasingly added to a slave acknowledgement pulse for each successive PTC. Values for the PI must be 0 or a multiple of 5 degrees and must be integrally divisible into 360 degrees.

Phase Accumulation Count (PAC)—One or more PTD plus PSD, as determined by the phase increment, needed to completely cycle through all phase increments from 0 to 360 degrees. This is a computed value which is equal to 360 divided by the PI. However, if the PI is left at 0, then the PAC is also 0. A value of 0 or 1 for PAC means only one PTD plus PSD completes a phase cycle. For example, a PI of 5 will render a PAC of 72, and, therefore, 72 repetitions of PTD plus PSD are needed to complete a single PAC.

Transmit Sleep Duration (TSD)—A provisioned value in the device in terms of hundreds of milliseconds (ms) which governs how long the transmitter is off between PAC.

Complete Transmit Interval (CTI)—A complete PAC Cycle followed by a TSD. Each CTI will produce a single accumulated count ready to be released through the USB port to the PC SW. The accumulated count should be made available immediately following the completed PAC.

Acknowledgement pulse (ACK)—This is a signal generated by a slave device and is used to acknowledge phase lock to an incoming stream of master pulses. The ACK must be uniquely identifiable to each particular slave device issuing its ACK. This could be very short pulses like the pulse stream from the master device, or it could be a longer pulse or another kind of wave signal. However, the ACK can take no longer to identify than a master pulse did that initiated it. Phase lock must take place over precisely the same number of received pulses each time a slave issues an ACK at the beginning of a PTI.

Phase Lock Loop (PLL)—The amount of time or number of received master pulses required for the slave device to lock its internal clock to the pulse stream from the master device. This must be a static unchanging value and provisioned to all client devices as they enter the RTLS domain.

DETAILED DESCRIPTION OF INVENTION

Referring to the two dimensional diagrams that are representative of the asynchronous TDOA determination domain, the domain in these diagrams are represented with 21 generic vertical markers (border to border inclusive) of equal distance apart from each other, forming precisely 20 equidistant spaces. This is an example for simplicity and in no way is intended as an absolute or even implied limit to the domain that this method may operate upon. In fact, the present invention is not limited by physical dimensions or bounded by any specific distance in any direction. Nor is the present invention specific to any particular signaling, signal medium, signal rate, time or resolution.

In describing the present invention in further detail, which is the method for determining asynchronous TDOA, the generic term for "pulse" will be used to interchangeably describe, but is not limited to, an ultra wide band (UWB) pulse, a narrow band pulse, a sinusoidal wave, a square wave, a packet, a cell, a particle, or any other signal of fixed and repeating deterministic and constant interval in the wired or wireless realm useful in providing a TDOA measurement. For example, recent acceptance and deployment of Bluetooth Low Energy (aka 4.0) into mobile devices for both Apple IOS and Android mobile phones may prove to be the perfect platform for the present invention. Whereby the transmission and arrival of a Bluetooth 4.0 packet would be analogous to the term "pulse" as described in the present invention, which assumes the arrival of such packets could be accurately timed in mobile client devices and repeated in the domain slave transceivers.

Figure 2:
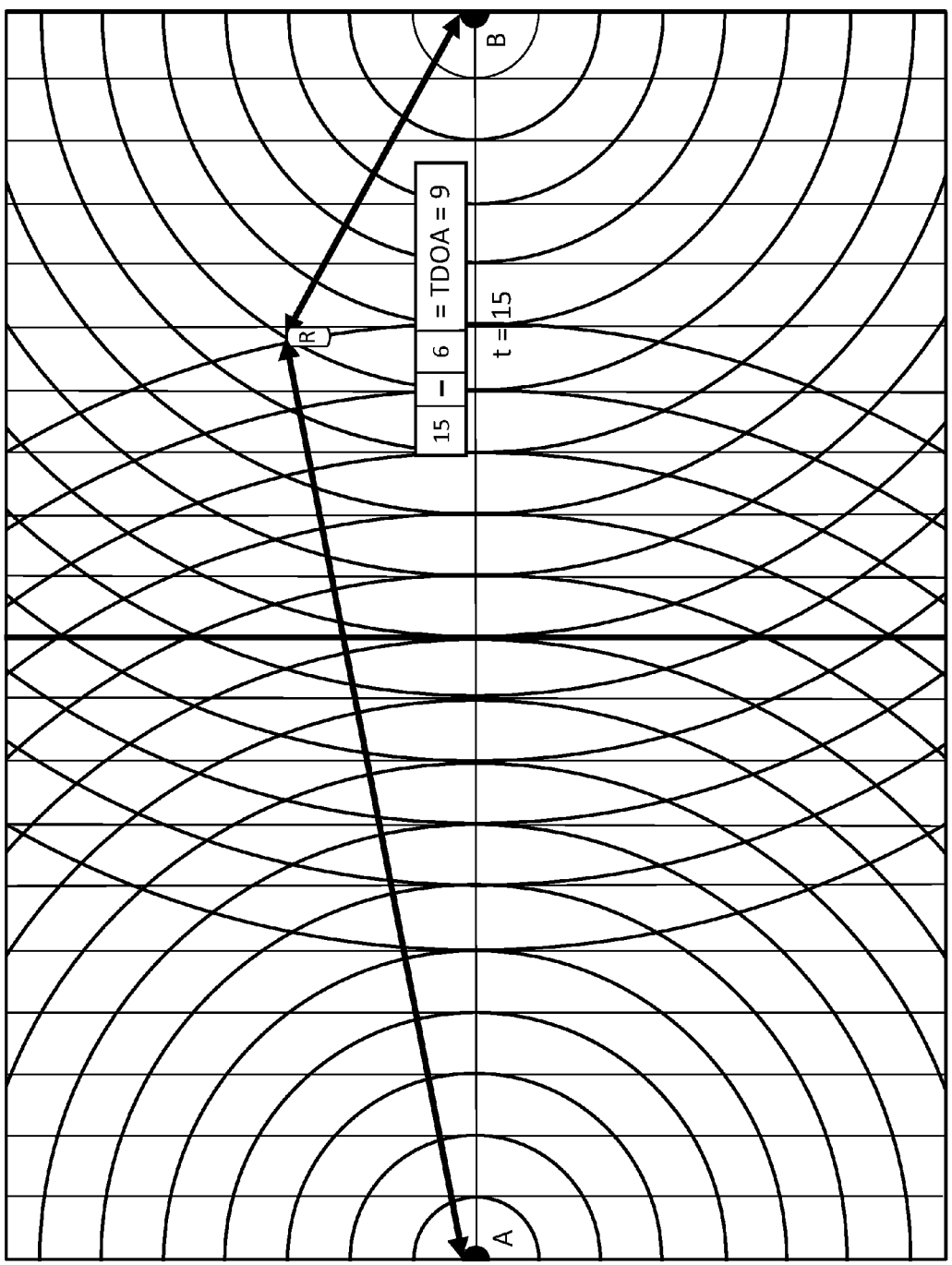
FIG. 2 is a two-dimensional drawing of a typical real time location domain with two synchronized emitters of known position and a single mobile device of unknown position at the end of the TDOA determination at a system time "T=15".

FIGS. 1 and 2 depict a common generalized method for synchronous TDOA determination in which two emitters A and B of known position are synchronously timed to emit a signal at precisely the same time. The signal is used by the mobile client device R in TDOA determination.

FIG. 1 describes a snapshot in time at t=4 of a typical method for synchronous TDOA determination using two fixed location emitters and a single mobile roamer. FIG. 1 depicts a two dimensional configuration of a rectangular area representing a real time positioning domain or cell. The wireless emitters A and B are positioned at opposite boundaries of this domain and at fixed and known locations. Emitters A and B can emit known and distinguishable signals recognizable to the mobile client device R, which is located somewhere within the present invention's domain range. The signal being transmitted does not inherently contain any embedded or encoded information, but this does not preclude the signal from containing such information. In certain instances, embedding and encoding information may be quite useful but is not a requirement for the present invention. FIG. 1 depicts a snapshot in time where exactly four equal wavelengths or pulses of fixed intervals have been emitted by both emitters A and B. The TDOA in this case is based off the understanding that emitters A and B send a signal (e.g. RF wave, light pulse, RF pulse, sound, etc. . . . ) of the same velocity, synchronously in time, and radiating in a perfect circular pattern towards the mobile client device R. The mobile client device R as depicted in FIG. 1 is completely unaware that a signal has been sent by either emitter A or B.

FIG. 2 describes the same domain as FIG. 1 at time t=15. Typically using a high resolution real time clock, the mobile client device R will time the difference between the signal arrivals from emitters A and B. For demonstration purposes and to clarify a comparison in methods, the clocks depicted in FIGS. 1 and 2 are in terms of even wavelengths, pulse cycles, or packets as the case may be. In reality, these clocks would likely be in fractions of seconds (e.g. milliseconds, microseconds, nanoseconds, etc). The fact that these times are displayed in whole wavelengths is for visual simplicity only and for common comparison with the new method described in the present invention.

Figure 3:
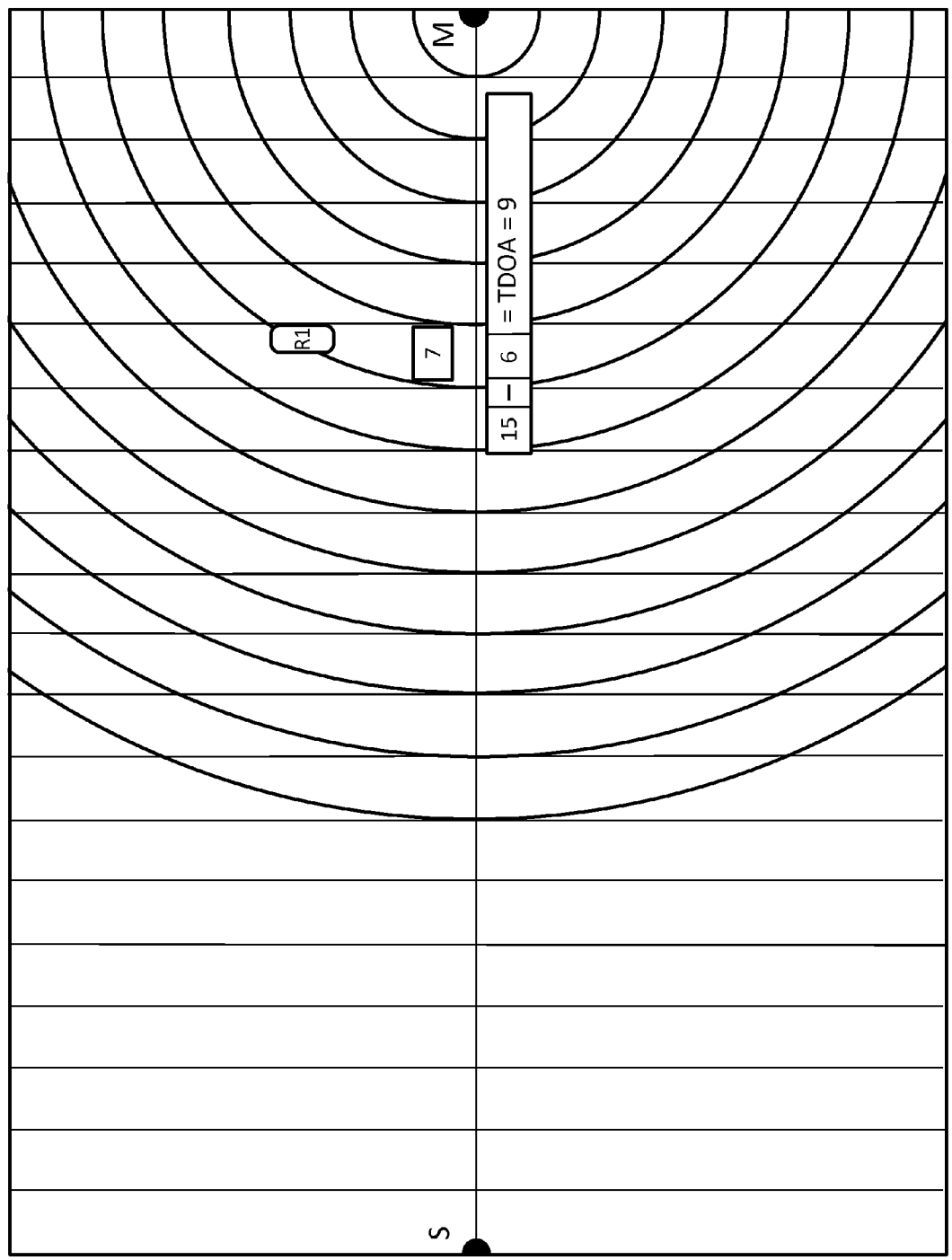
FIG. 3 is a two-dimensional drawing of a real time location domain using the method of the present invention containing two asynchronous emitters of known position and a single mobile device of unknown position at a mobile time "T=7".
Figure 4:
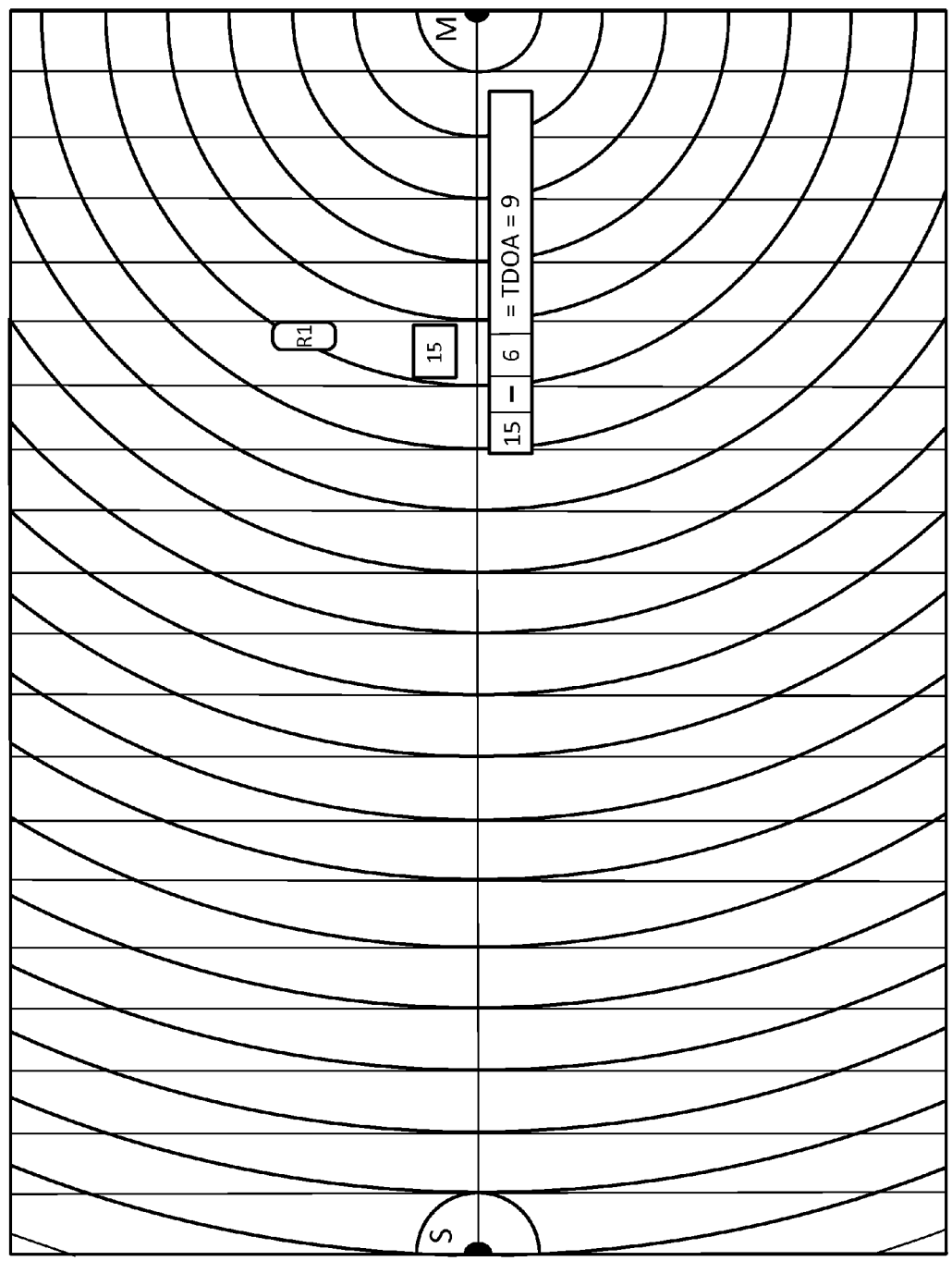
FIG. 4 is a two-dimensional drawing of a real time location domain using the method of the present invention containing two asynchronous emitters of known position and a single mobile device of unknown position at a mobile time "T=15" after the slave emitter has responded.
Figure 5:
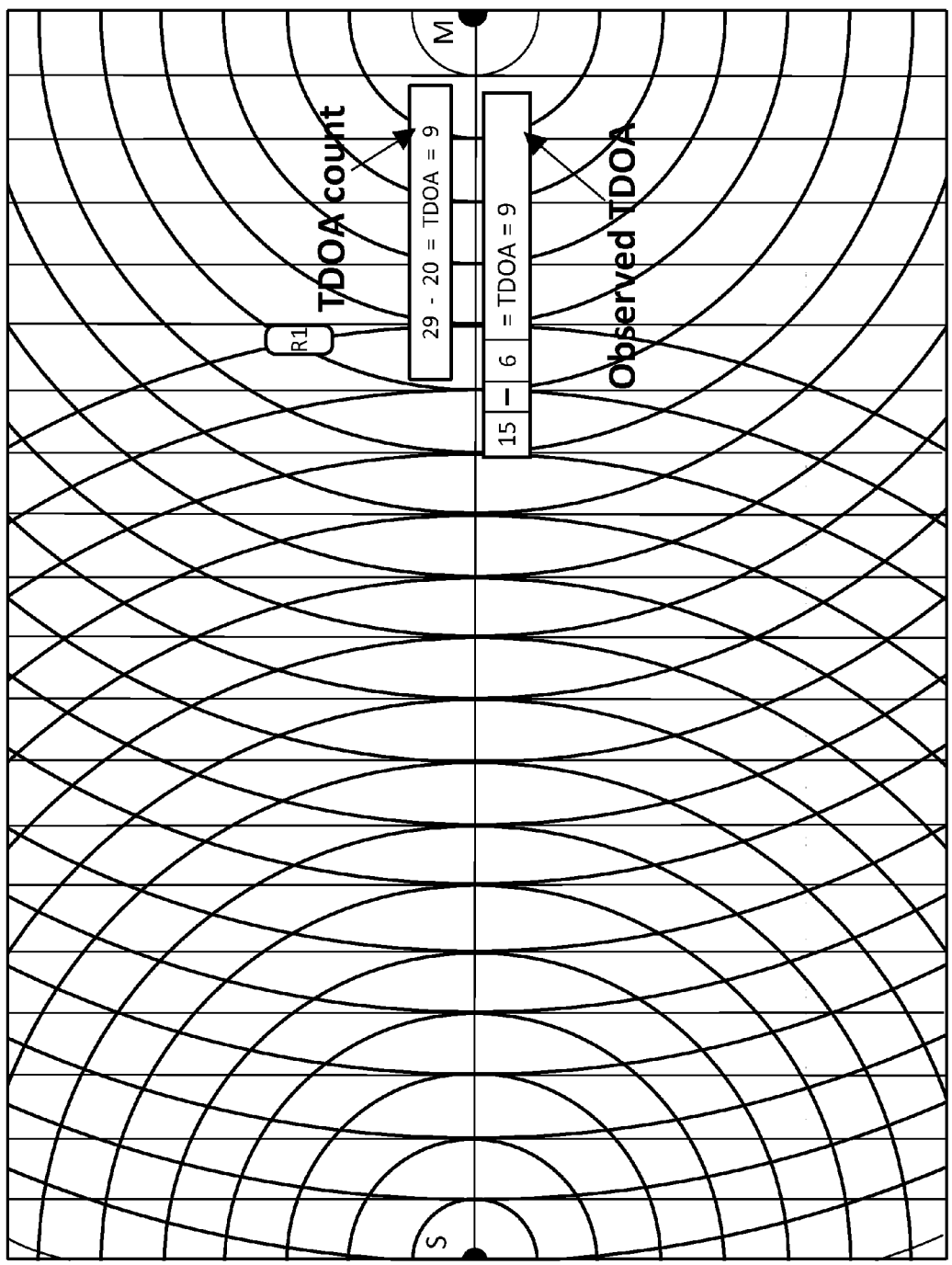
FIG. 5 is a two-dimensional drawing of a real time location domain using the method of the present invention containing two asynchronous emitters of known position and a single mobile device of unknown position at a mobile time "T=29" at the end of the asynchronous TDOA determination described in the present invention.

Referring now to FIGS. 3 through 5, these figures depict a similar location domain in physical characteristics as the domain in FIGS. 1 and 2. However, the domain shown in FIGS. 3 through 5 will use the new method described by the present invention.

Referring now to the present invention in detail, the mobile device R1 in FIG. 3 will have at least one, but more likely two or three, internal counters. However, the mobile client device R1 is not limited to only three counters. Each counter will be reserved and associated with a particular master-slave pair in one or more domains. These counters will be used to store the raw or observed difference in distance (DiD) values needed later for multilateration or any other real time location algorithms to be used at a higher level. Alternatively, a single counter could be used with multiple dedicated buffers.

Referring now to the present invention in still more detail, a master transmitter may interact with one or more active slave emitters in any given location cycle either simultaneously or sequentially. The method described in this present invention describes the determination of up to three DiD actual measurements in a single domain and therefore the interactions of a single master device with up to three slave devices. However, this in no way limits this method or any process inferred herein to a serial action between a single or any particular number of master-slave pairs. In fact, this method should work quite well with multiple adjacent location domains each having any number of slave interactions and virtually limitless as to the number of roaming client devices being served.

Referring again to the present invention in more detail, in FIG. 3, the two fixed position emitters do not synchronously begin transmission of their respective signals as depicted in FIGS. 1 and 2. Therefore, the emitters in FIGS. 3 through 5 are labeled as a master device M and a slave device S. Additionally, the method for asynchronous DID determination in the present invention does not require (nor inhibit) the mobile client device R to clock the time between receiving signals from the two fixed point emitters. Rather, the mobile client device R merely counts a series of pulses transmitted from the master device M until receiving an acknowledgement pulse from the slave device S. The master device M will transmit the series of pulses at a predetermined interval. In this manner, the master device M may be maintained as the only clock in the system thus eliminating jitter and wander between diverse clocks. FIG. 3 depicts the initiation of the series of pulses that have passed by the mobile client device R1 but not yet reached the slave device S. In FIG. 3, an outside observer would know the TDOA is equivalent to 9 pulses. However, at the time of the snapshot in FIG. 3, the mobile client device R1 only knows is the constant distance between the master device M and the slave device S, which is 20, and its counter has incremented up to 7.

Referring still to the present invention for more detail, FIG. 4 depicts what happens just after the slave device S responds to the series of pulses incoming from the master device M. In some configurations, the slave device S may be passive and simply reflect the signal from the master device M, and, in other cases, the slave device S may be active and generate the acknowledgement pulse with a known or deterministic delay (if any) to the mobile client device R1 by maintaining a phase lock loop (PLL) with the master device M. In either case, the method referred to by the present invention functionally remains the same with respect to the mobile device R1 and the master device M. The raw or observed asynchronous DiD values collected by the present invention is converted to the true or actual asynchronous DiD by subtracting out the delay in the response time of the slave device S. The true or actual asynchronous DiD values may occur outside the raw asynchronous DiD determination function. FIG. 4 is a continuation of FIG. 3 in time and shows that the counter of the mobile client device R1 is up to 15, which means that 15 pulses have been counted since the first pulse arrived at the mobile client device R1 starting with a count of zero prior to the arrival of the first pulse. The mobile client device R1 will continue to count until receiving an acknowledgment pulse reflected or generated from the slave device S.

Referring again to the present invention for more detail, FIG. 5 is a continuation of FIGS. 3 and 4 in time and depicts that the counted asynchronous DiD values does in fact match the observed synchronous TDOA described in FIGS. 1 and 2, and the present invention does this without the use of any high precision real time clocks or even a synchronous network. The master device M will continue to pulse for a predefined period of time, which is equivalent to the signal traversing to the farthest reaches of the RTLS domain and back to the master device M. After predefined period of time, the master device M will cease pulsing and the asynchronous DiD determination cycle will terminate until the master device M starts to emit the series of pulse again on its regularly scheduled cycle. Once the acknowledgement pulse from the slave device S arrives at the mobile client device R1, its counter will stop incrementing as the series of pulses travel past the mobile client device R1. In FIG. 5, the observed DiD can be easily determined by simply counting the number of concentric pulse circles displayed in FIG. 5 from the slave device S on the left to the mobile client device R1 and then by subtracting the number of pulse circles from the master device M on the right to the mobile client device R1. The observed DiD from FIGS. 3 through 5 is also equivalent to the results from FIGS. 1 and 2 operating in a synchronous environment.

In a specific embodiment of the present invention, FIGS. 3 through 5 illustrate a step-by-step method for a single asynchronous TDOA determination without phased slave acknowledgements. This TDOA is between the master device M and the slave device S (hereinafter referred to as TDOAab). This embodiment of the present invention is described in the following steps:

1. A master device M with a slave device S is positioned within a designated RTLS domain. The slave device S can be either an active regenerator or passive signal reflector. The slave device S is not limited to either of the aforementioned devices and can be any other device performing effectively the same functionality.
2. The master device M and the associated slave device S act as a paired unit and can interact with an unlimited number of mobile client devices. The communication is always a unidirectional "one to many" relationship between the master-slave pair and the unlimited number of mobile roamers, which are listening to the signal from the master-slave pair.
3. On a regular predetermined positioning cycle interval and at a time "t(0−b)" relative to the mobile client device R1, the master device M will begin to transmit a series of pulses at an regular and predetermined interval that is known by the mobile client R1. The constant distance c is between the master device M and any particular mobile client device in terms of whole or partial pulse lengths. The master device M will continue transmitting pulses on its predetermined regular intervals for a fixed time period, which is equal to the time it takes the first pulse to reach the farthest slave device plus the time it takes to have its acknowledge pulse travel all the way back to the master device M. This allows the present invention to completely cover the RTLS domain with pulses from the master device M and worst case acknowledgement pulses from the slave device S.
4. At a time "t(0)" relative to the mobile client device R1, the mobile client device R1 will receive the first pulse from the master device M and reset its internal counter relative to the particular master-slave pair associated with the first pulse. The relationship between the series of pulses and its particular master/slave pair can be determined through a number of different methods that include, but are not limited to, pulse carrier frequency, pulse carrier modulation, time slot, and sequential iteration.
5. For each subsequent pulse received by the mobile client device R1 prior to receiving an acknowledgement pulse from the associated slave device S, the mobile client device R1 will increment its counter associated with that particular master-slave pair. While this method uses the series of pulses as a means to increment the counter, the present invention does not preclude using a local oscillator or digital timer to perform the same functionality even if they are somewhat less accurate. In fact, this derivation of the method is somewhat useful under certain circumstances.
6. At a time "t(d+PLL)" relative to the mobile client device R1, the acknowledgement pulse will arrive at the mobile client device R1, which will terminate its counter relative to that particular slave device or will latch a common counter into a buffer dedicated to accumulating pulses for that particular slave device. A distance a is the distance between the slave device S and the mobile client device R1. A distance b is the distance between the master device M and the mobile client device R1. The distance c is the distance between the master device M and the slave device S. The PLL is any delay by the slave device in transmitting the acknowledgement pulse after receiving the first pulse from the master salve M. The raw or observed value of the counter, which is without the PLL delay time, represents the distance d within the relationship "d−c=a−b", which is referred to in FIG. 6 as a part of a mathematical proof. Due to the fact that the distance c is a constant known value, inserting the distance d into the aforementioned relationship eventually reveals that the value for TDOAab is equal to "d−c".

Referring now to the present invention in more detail, the raw or observed value determined in step 6 of the method must be subtracted out the distance in terms of pulse counts between the master device M and the slave device S (distance c) to arrive at a useful asynchronous DiD determination, which has a resolution in terms of a whole pulse intervals. Any known delay in the slave device S or from the value for the distance d must also be out the distance in terms of pulse counts between the master device M and the slave device S (distance c) to arrive at the useful asynchronous DiD determination. Step 6 of the method is analogous to the mathematical proof defined below and referred to in FIG. 6. The resolution of this process is directly related to the length of the predetermined intervals used for the series of pulses.

Figure 6:
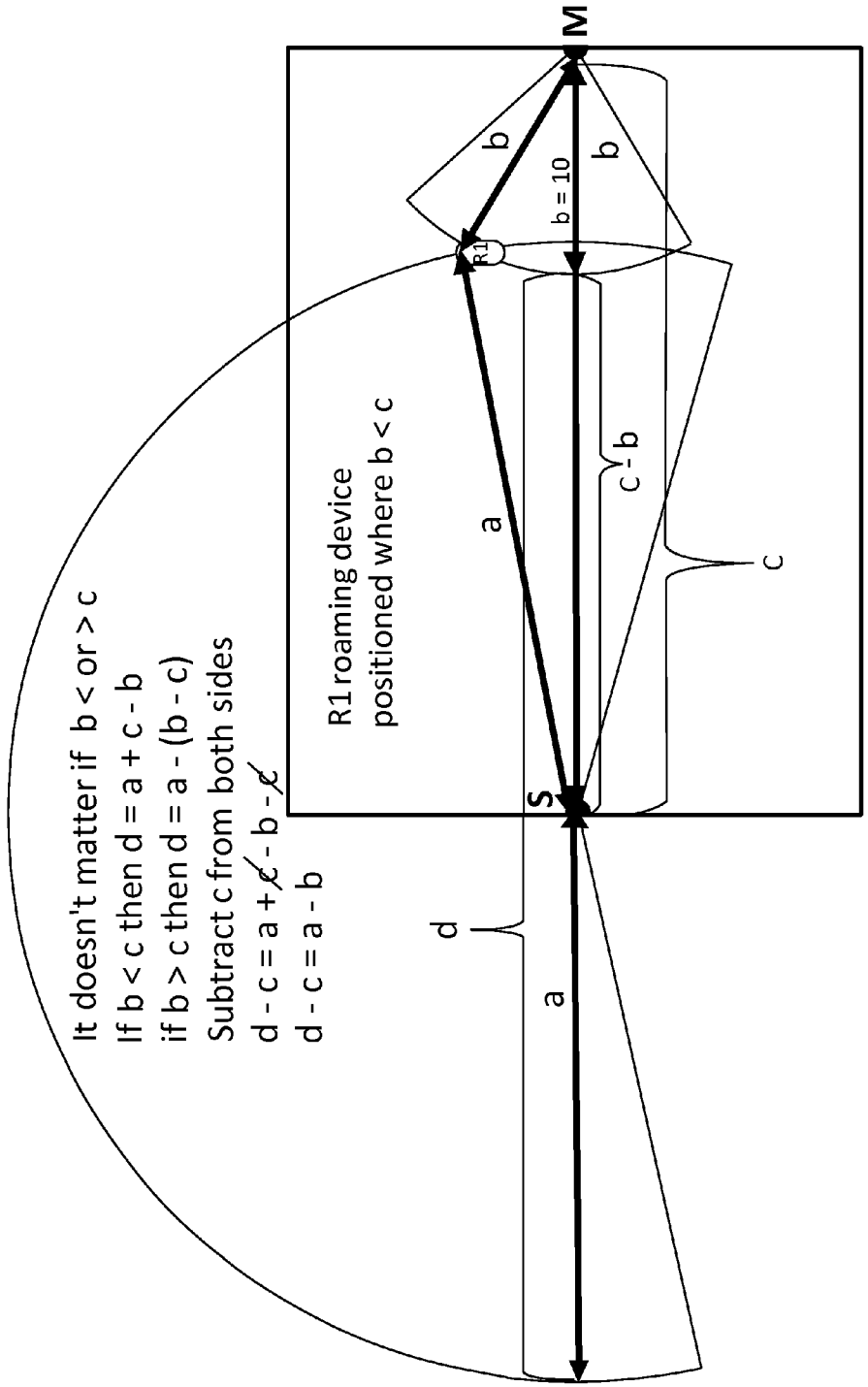
FIG. 6 depicts a mathematical proof for the method of asynchronous TDOA determination using a pulse counter, wherein the mobile device is somewhere outside of the line from the mobile device to the slave emitters.
Figure 7:
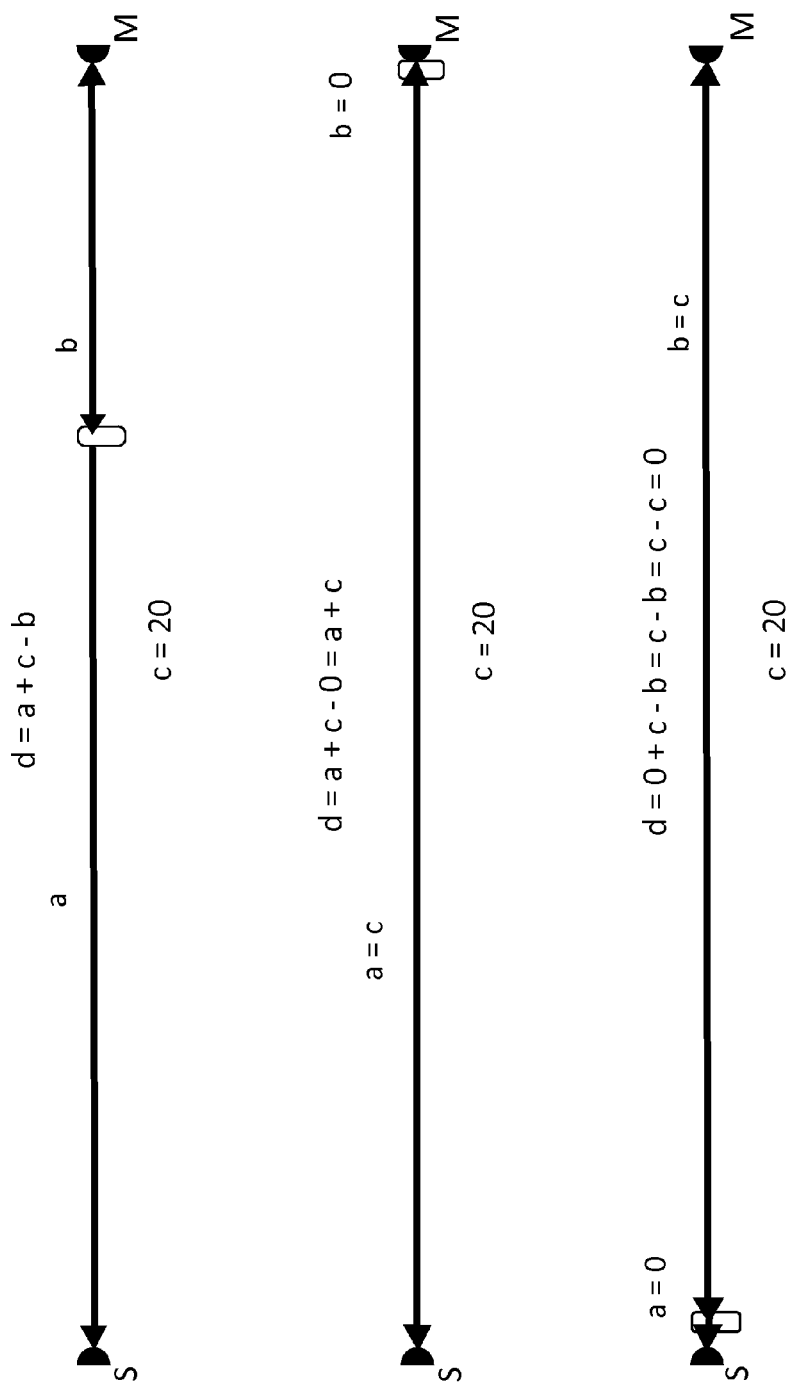
FIG. 7 supports the mathematical proof for this method of asynchronous TDOA determination using a pulse counter, wherein the mobile device is somewhere on the line from the mobile device to the slave emitters.

Referring again to the present invention for more detail, there exist only two possibilities for positioning of the mobile client device R1 relative to the master device M and the slave device S. Referring to FIGS. 6 and 7, the mobile client device R1 of unknown position can exist outside the line between the master slave M and the slave device S as depicted in FIG. 6, or the mobile client device R1 can be positioned somewhere around the line between the master slave M and the slave device S as depicted in FIG. 7. The mathematical proof shows that the method of the present invention is applicable to all cases where the mobile client device R1 lies outside the line from the master device M to the slave device S so that a triangle is formed with the distances a, b, and c as its sides. The mathematical proof is as follows:
1. Given for any triangle with the distances a, b, and c as its sides, the length of any two sides added together must be greater than the length of the third side.
2. Therefore, it is known that "c+a>b" by referring to FIG. 6.
3. We can then add the distance a adjacent to the distance c in order to form a straight line of a length c+a.
4. If the distance b is coincidently projected upon the length c+a, then there must be some remaining length since it is known that "c+a>b" from steps 1 and 2. We will label that remaining length as the distance d in order to define the relation "d=a+c−b".
5. Regardless of whether "b>c" or "b<c", the working relationship between distances a, b, c, and d is an equation "b+d=c+a".
6. By subtracting the distance b and the distance c from both sides of the equation in step 5, the equation becomes "d−c=a−b".
7. Using the method defined in the present invention, the value of distance d is determined by counting pulses from the time the first pulse of the master device M reaches the mobile client device R1 until its acknowledgement pulse reaches the mobile client device R1 from the slave device S. In addition to counting pulses, the value of distance d is also determined by subtracting out the delay in the reflected or phase locked acknowledgement phase if there is any.
8. The TDOA that is required for this method is TDOAab, which is equal to "a−b". Since the distance c is a constant and the distance d can be calculated via the method described in the present invention, TDOAab substitutes "d−c" for "a−b" in order to derive the equation "TDOAab=d−c".

Referring again to the present invention and now to FIG. 7 for more detail, the mobile client device R1 could be precisely on the line between the master device M and the slave device S or could be so close to either the master device M and the slave device S so that the mobile client device R1 is not within a measureable resolution to either the master device M or the slave device S. This does not change the mathematical proof described above except for the fact that the distances a, b, and c do not form a triangle and now "c+a≥b". This means that the distance b may already be coincident upon the distance c, and, thus, the distance b does not need to be projected onto the distance c (because the distance b is inherently projected upon the distance c). In addition, either the distance a or the distance b could be zero. Moreover, if the distance a is zero, then the distance d is automatically zero. The mathematical proof given above is valid for any of these scenarios. Therefore, any mobile device of unknown position, anywhere in three dimensional space, can calculate an asynchronous DiD based on received signals from the master device M and the slave device S using the exact same method described in this present invention.

The objective of the present invention is to provide a small mobile footprint and the least-cost asynchronous determination infrastructure at the highest resolution possible, which in turn enables the highest grade of positioning algorithms. Consequently, the preferred embodiment of the present invention is described with the following. The speed of light can be used as a consistent method for gauging distance and the difference in distance. However, even for a signal at 2.4 GHz, a single wavelength is approximately 5 inches long and travels through a receiving antenna in about 416 picoseconds. Therefore, even if the pulses mentioned in the method above occur on every whole 2.4 GHz wavelength interval, the present invention would require a much faster carrier and would have to count pulses/wavelengths every 400 picoseconds. From this, the present invention would still produce ±5 inches of error in the asynchronous DiD. In addition, this error is only a single dimension of our three dimensional positioning algorithm.

In order to reduce the error produced by the present invention, the method above needs to be repeated with larger pulse intervals while slightly shifting the phase of the pulse on each interval. This can be done through two different techniques. One technique is to phase shift the series of pulses from the master device M on each successive pulse transmission repetition or pass. However, since the algorithm for the present invention is asynchronous relative to all of its system components, the master device M would then need to also provide some kind of phase marker as a reference to the other system components, or the phase shift would be meaningless. A second technique that is far simpler is to keep the master device M ignorant of the phase shifting and to use the slave acknowledgment to phase shift relative to a phase lock from the series of pulses from the master device M. From this technique, the mobile client device follows the exact same counting algorithm for each successive phase shift without needing to know which particular phase increment is being used at any particular moment. Thus, the resulting signal relative to the client mobile device is exactly the same in the second technique as the first technique under the following conditions: each phase increment is used only once during one phase cycle and can be used in any order during that phase cycle. The second technique is used in the preferred embodiment of the present invention.

Figure 8:
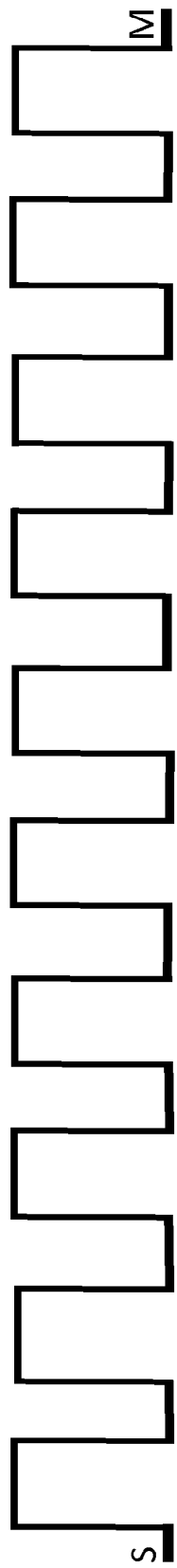
FIG. 8 is a generic diagram of a pulse.
Figure 9:
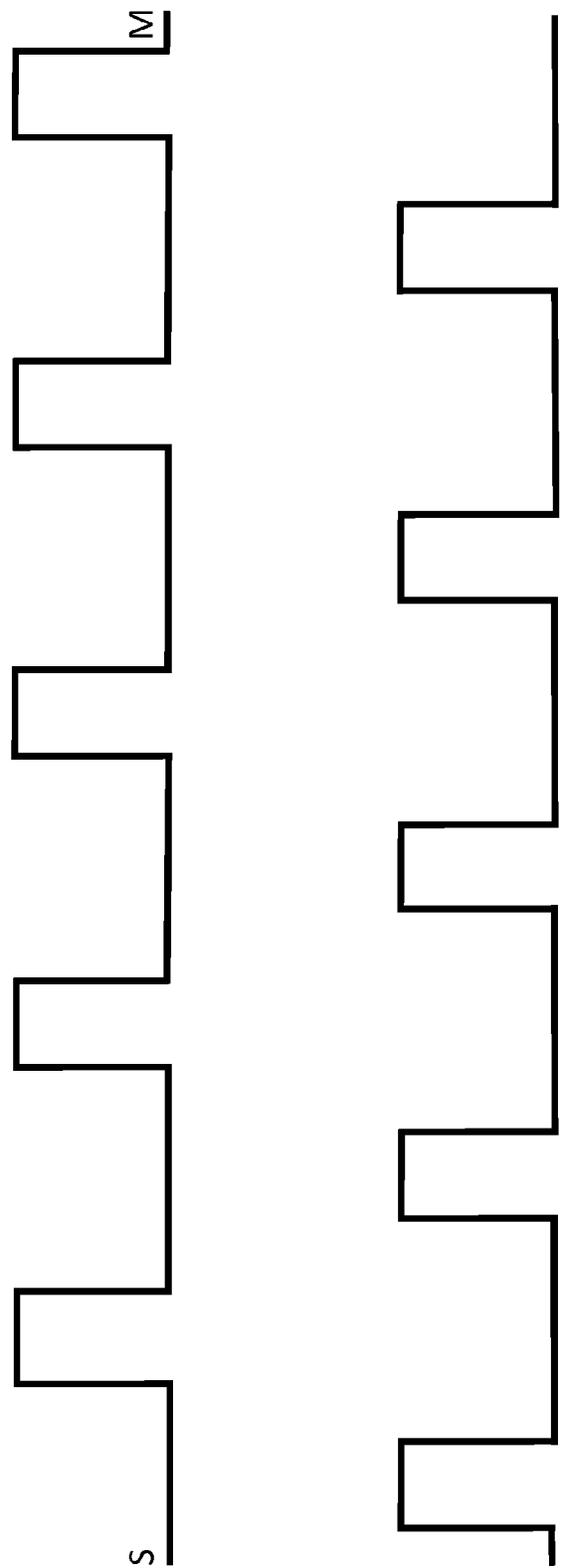
FIG. 9 is a generic diagram of two pulse streams that are 180 degrees out of phase with each other and have double the interval of the pulse diagram shown in FIG. 8.

Referring now to the present invention in still more detail on how to improve the asynchronous DiD resolution, FIGS. 8 and 9 describe how pulses can be phase shifted and counted with only a slight modification to the method described above. The preferred method shows how a series of pulses can be separately transmitted at two different phases with half as many pulses during each transmission, which allows for an equal pulse count using a slight modification to the methods described by the present invention. The preferred method can be used repeatedly to increase the predetermined pulse interval so that extremely low cost components can be used for present invention and so that the present invention can be integrated into a SIM, RFID, or other Smart-Card device. Relative to the typical human user or mobile client device, the preferred method can also be done with very little effect on the time taken to complete the overall asynchronous DiD determination. The diagrams for the present invention only demonstrate two passes, which in no way limits the number of passes that can be used during the preferred method. Moreover, the number of passes and the corresponding number of pulse phase shifts are virtually limitless in order to achieve the highest possible resolution.

Figure 10:
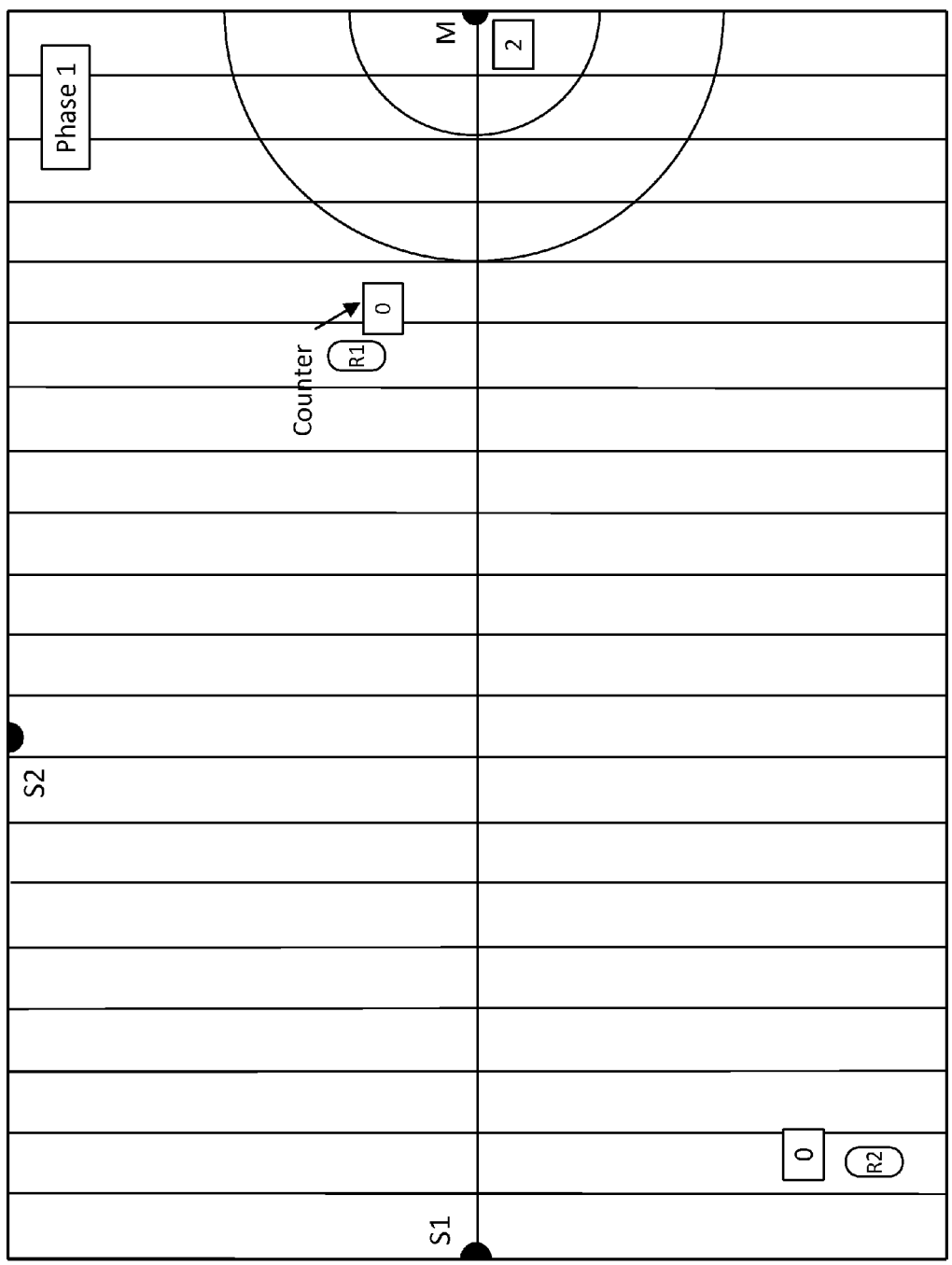
FIGS. 10 through 31 are two-dimensional drawings of a three-dimensional real time location domain with a single master transmitter M and two slave transceivers S1 and S2 involved in two phase (0° and 180°) DiD determinations relative to two roamers R1 and R2 at various progressive states of the DiD/asynchronous TDOA determination process described in the present invention. The counter next to the master transmitter M indicates the number of pulses that is currently out-pulsed by the master transmitter M. The upper number, next to the roamers R1 and R2, indicate the current count of received pulses from the master transmitter M relative to the roamers R1 and R2. The lower two numbers next to the roamers R1 and R2 indicate the accumulated counts of master pulses prior to the received acknowledgements from the slaves S1 and S2, which latch the upper counter to the lower accumulator relative to the slave acknowledgment being received.

Referring now to the present invention in still more detail on how to improve the asynchronous DiD resolution by increasing predetermined pulse intervals and phase shifting pulses, FIG. 10 depicts a pulse with twice the interval radiated across the RTLS domain. The objective of FIG. 10 and subsequent figures is to demonstrate how the preferred method counts the same number of whole pulses in two passes by phase shifting and doubling pulse intervals as the generalized method does a single pass without phase shifting and doubling the pulse interval. The only change from the generalized method is that the mobile client device does not reset its counter at the beginning of each cycle as defined in step 4 of the first method. Instead, an accumulator must be added for each acknowledgment pulse from a slave device, wherein the accumulated count acquired from multiple passes at different phases of a longer pulse interval stream is equivalent to the count acquired in a single pass without phase shifting the pulse stream of a shorter pulse interval stream.

Figure 11:
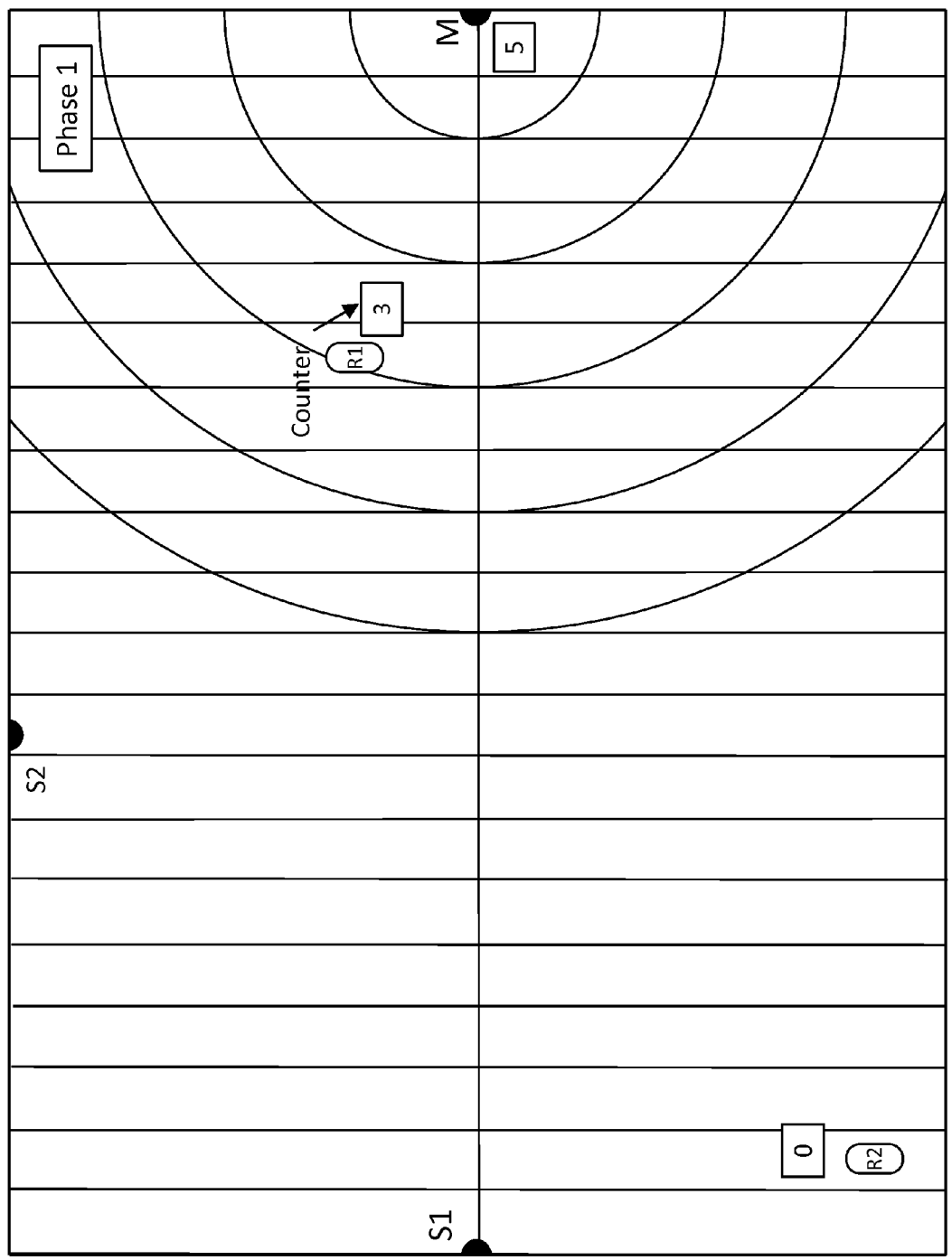
Figure 12:
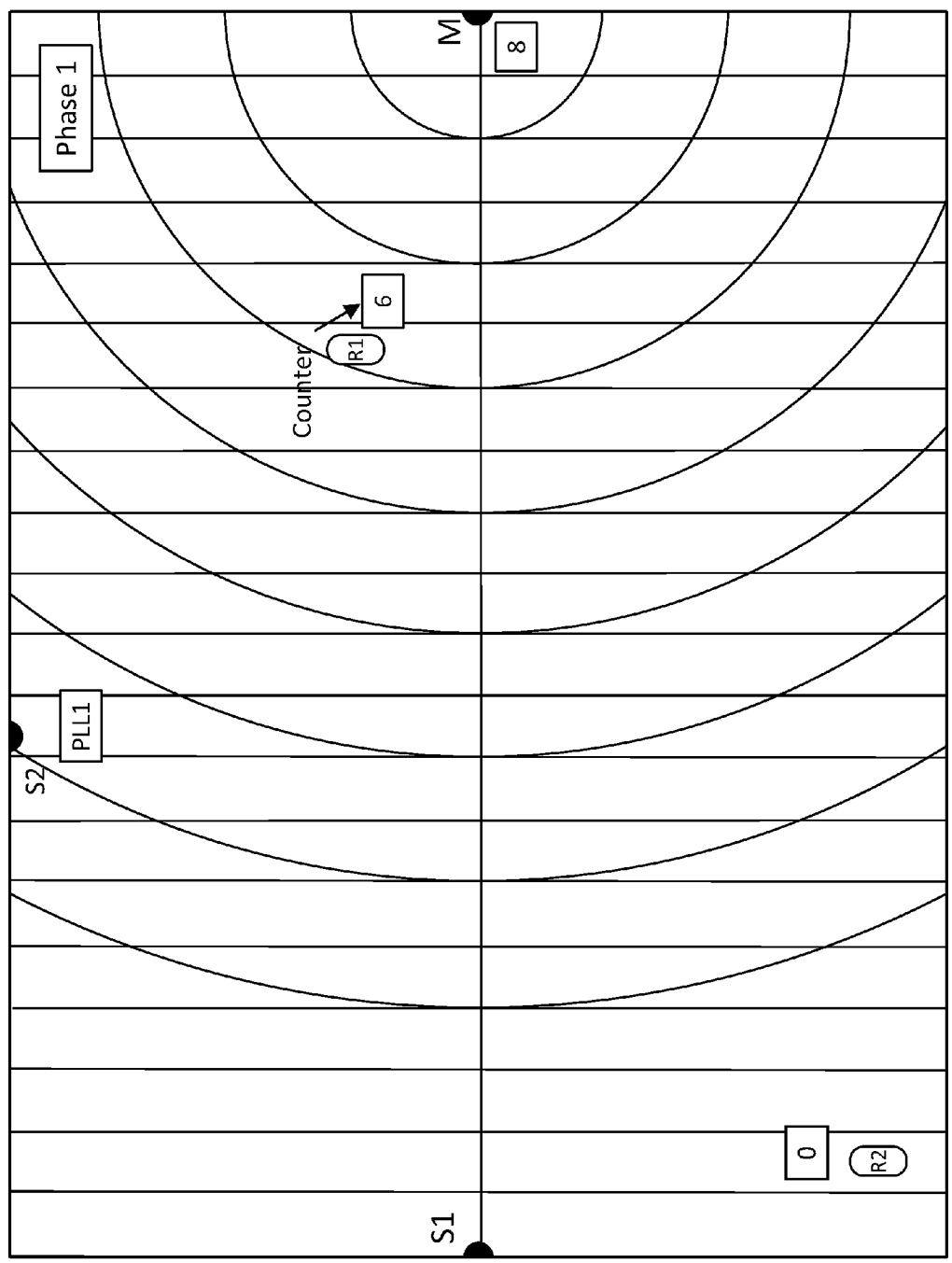
Figure 13:
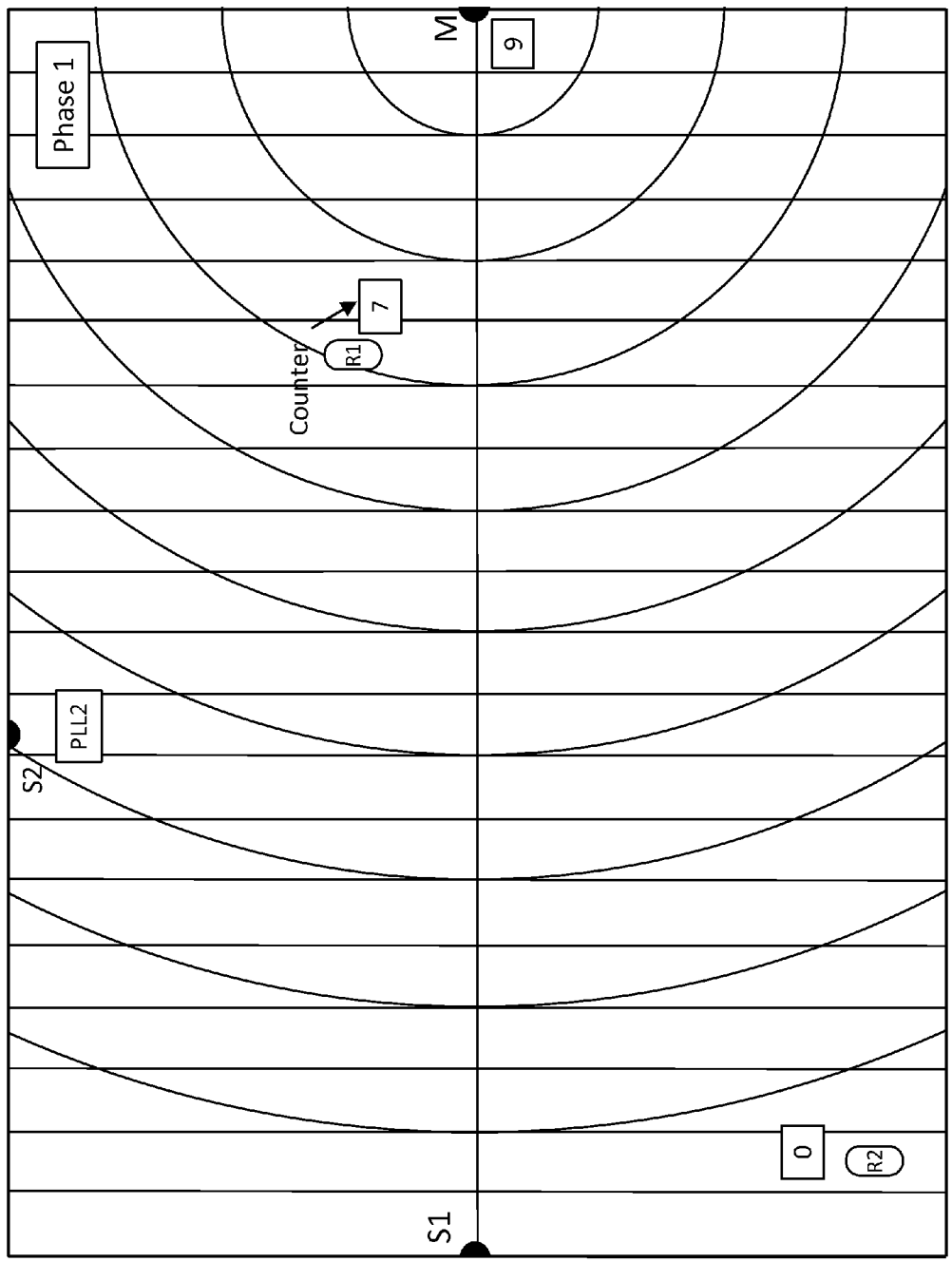
Figure 14:
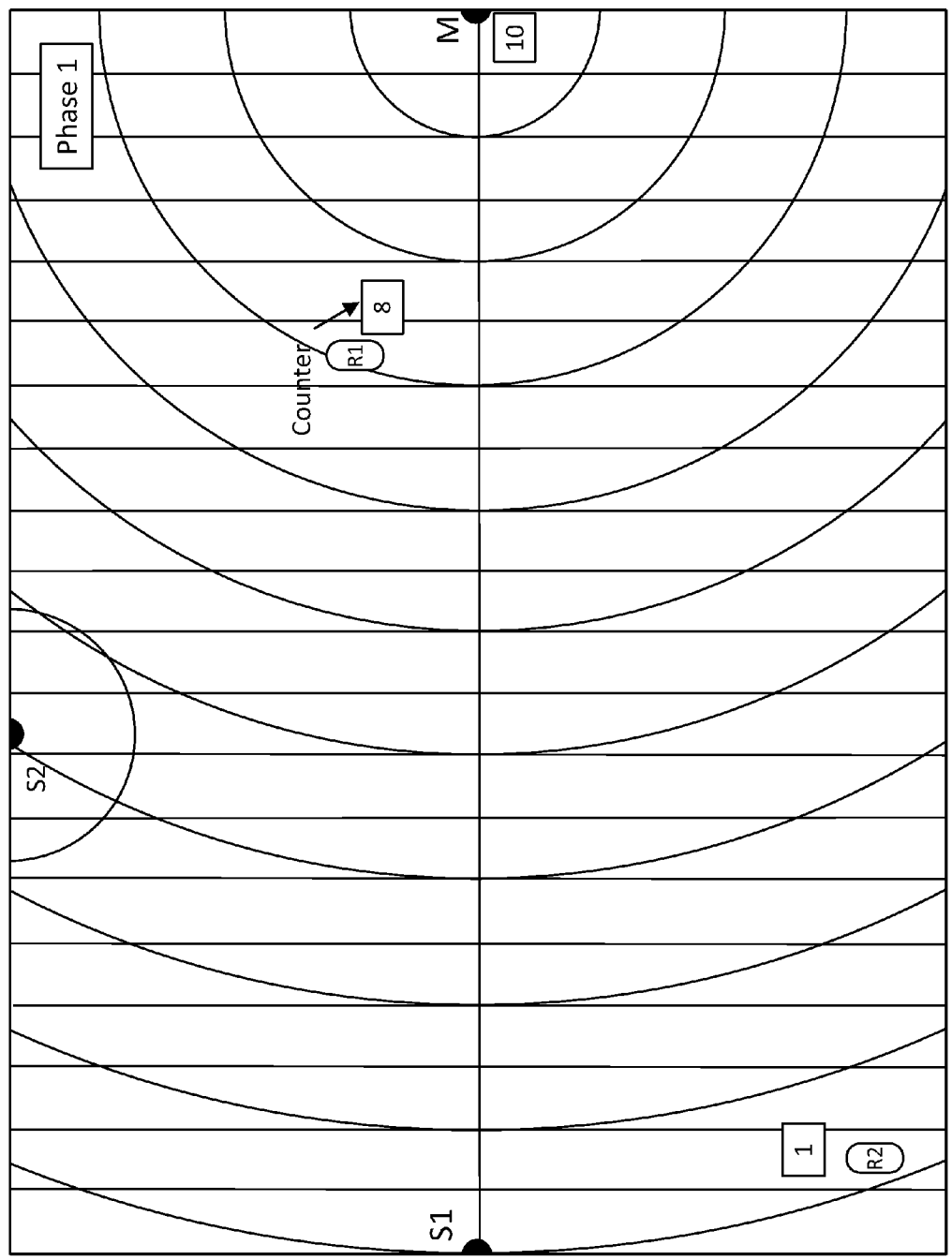
Figure 15:
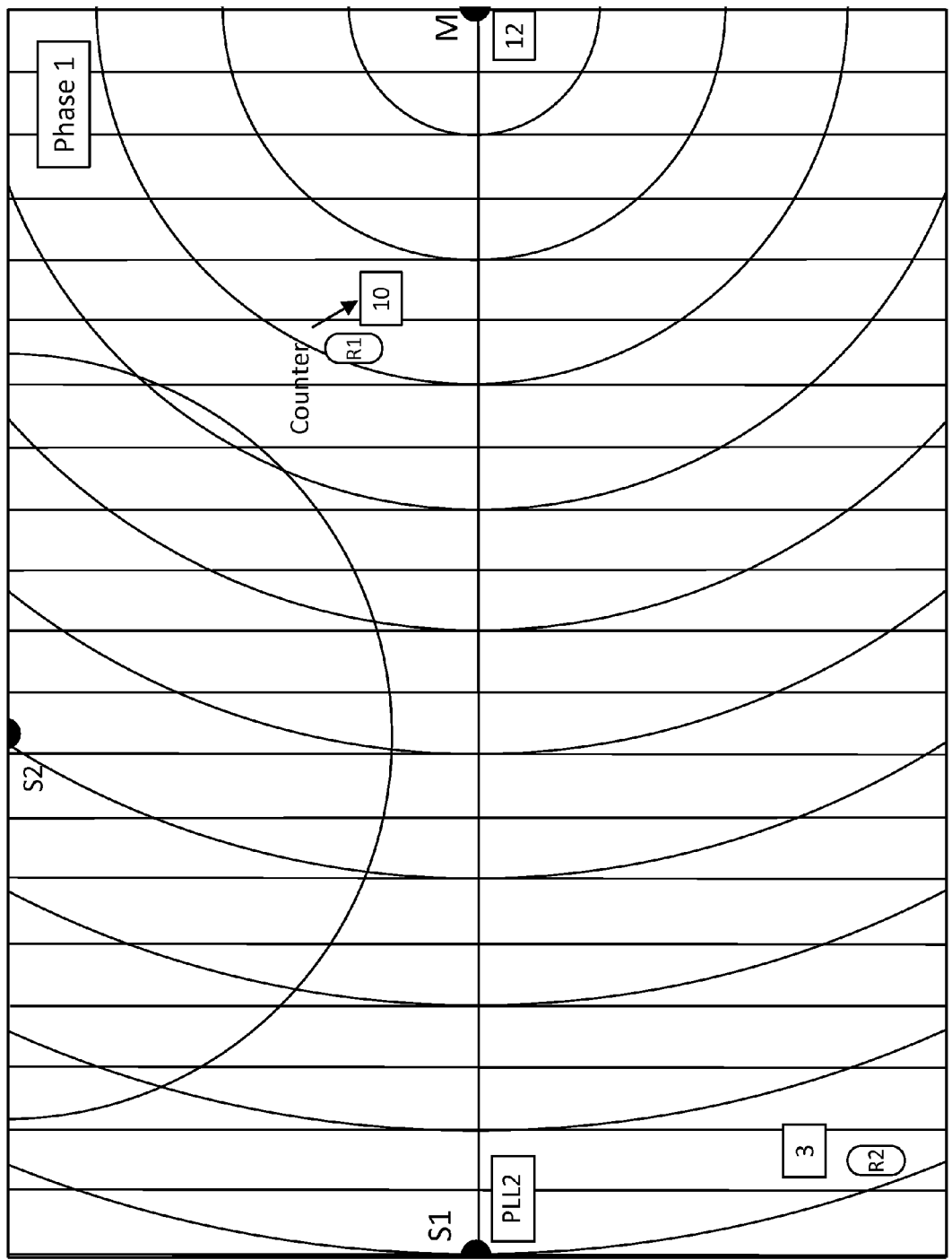
Figure 16:
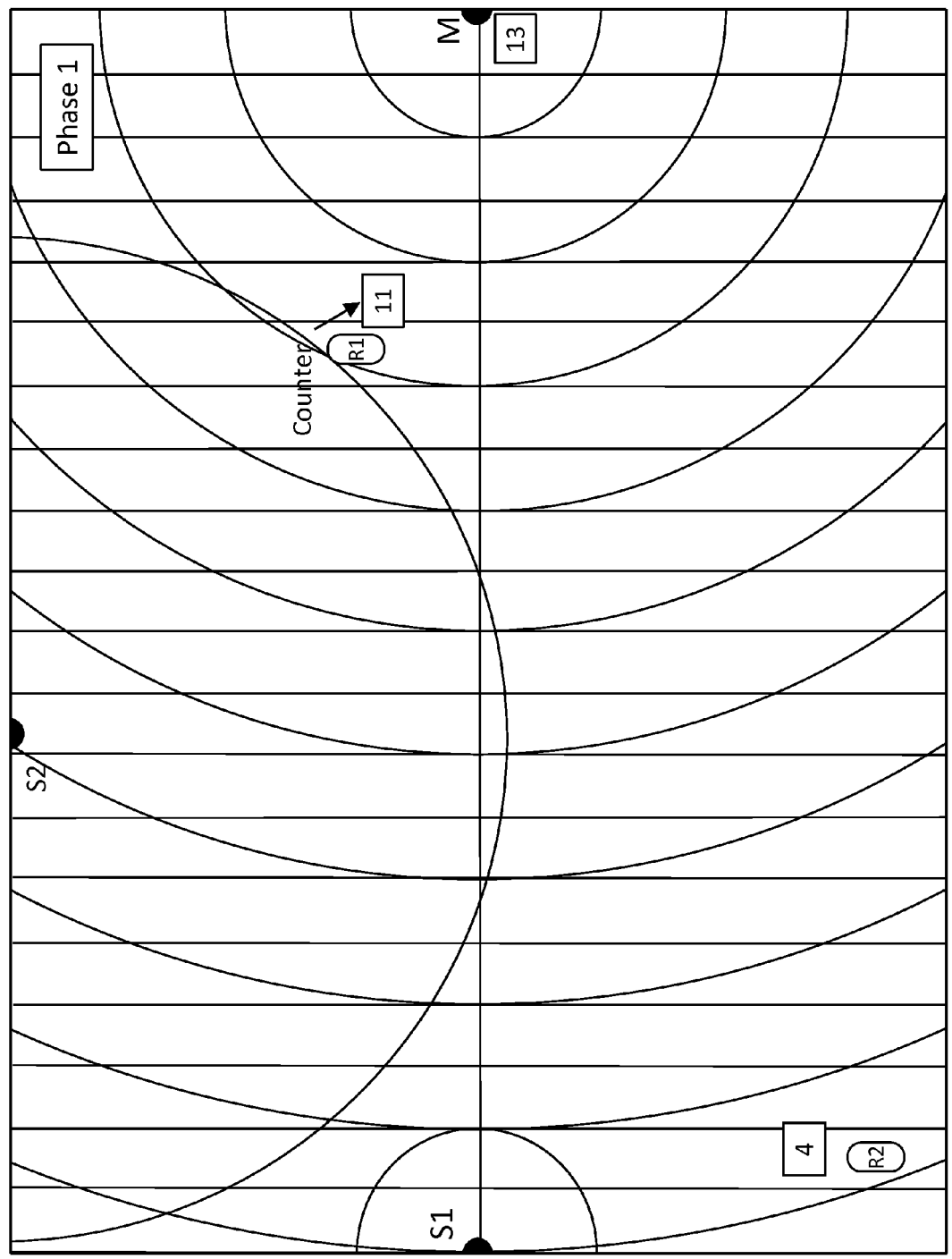
Figure 17:
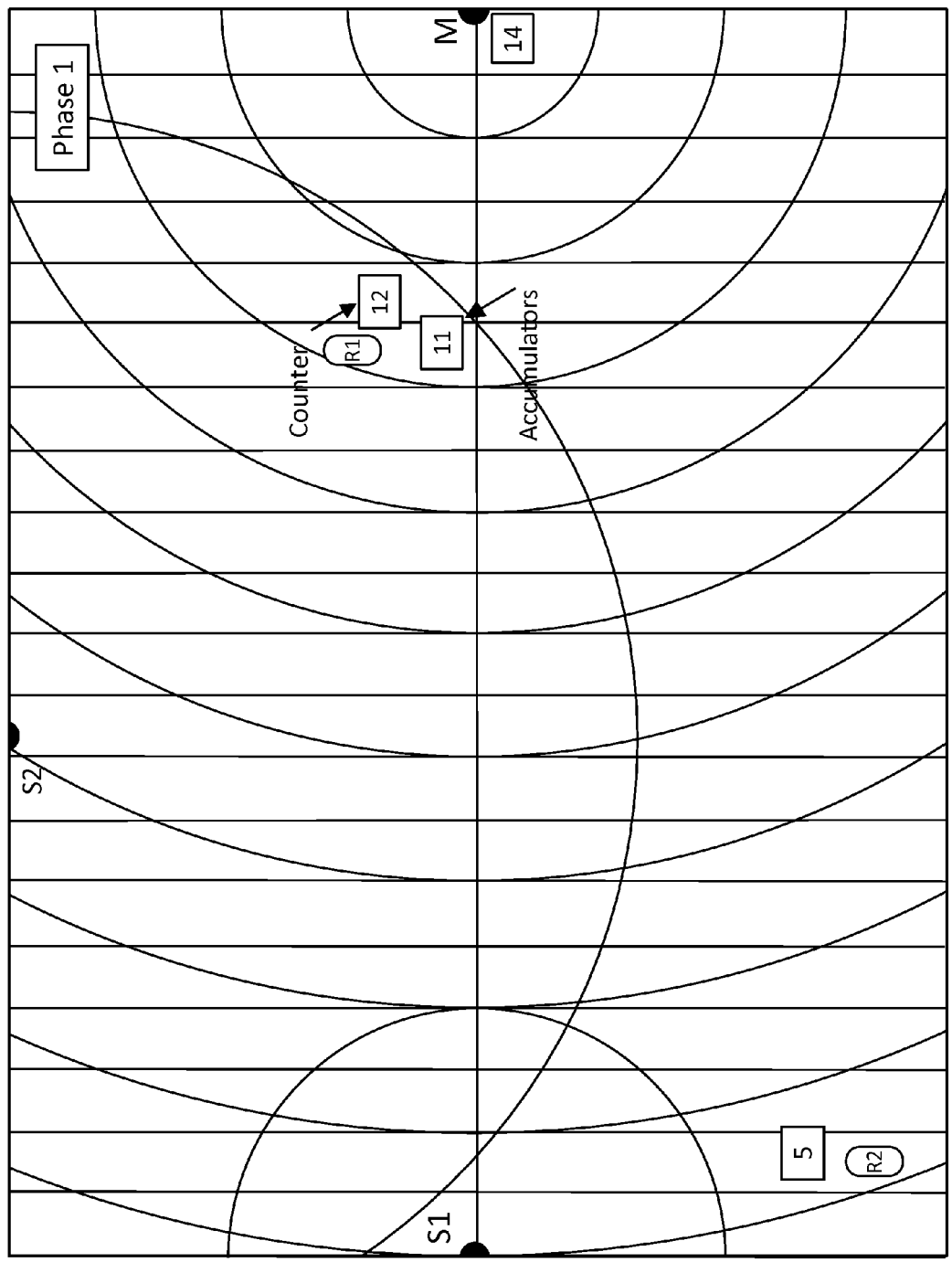
Figure 18:
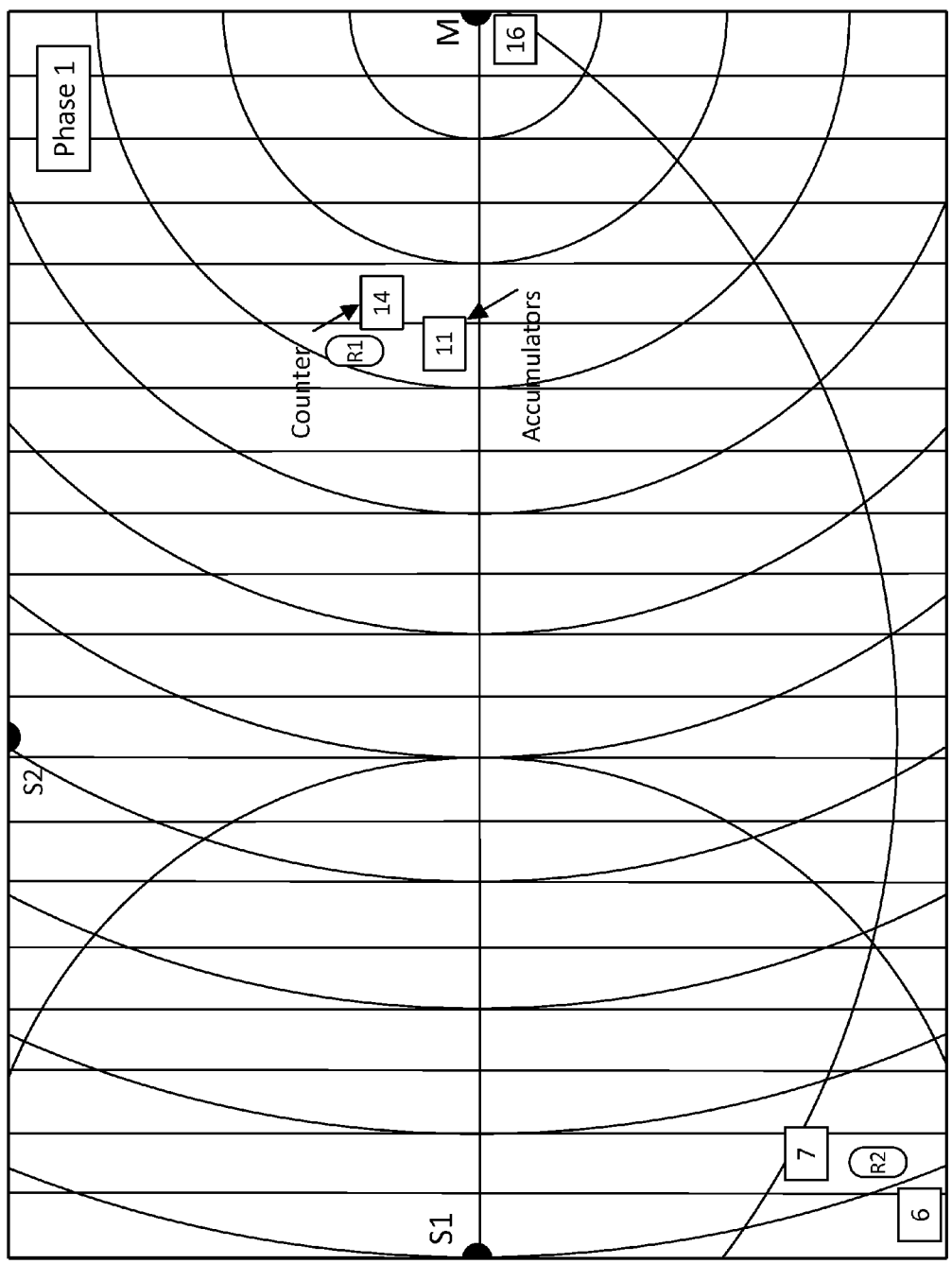
Figure 19:
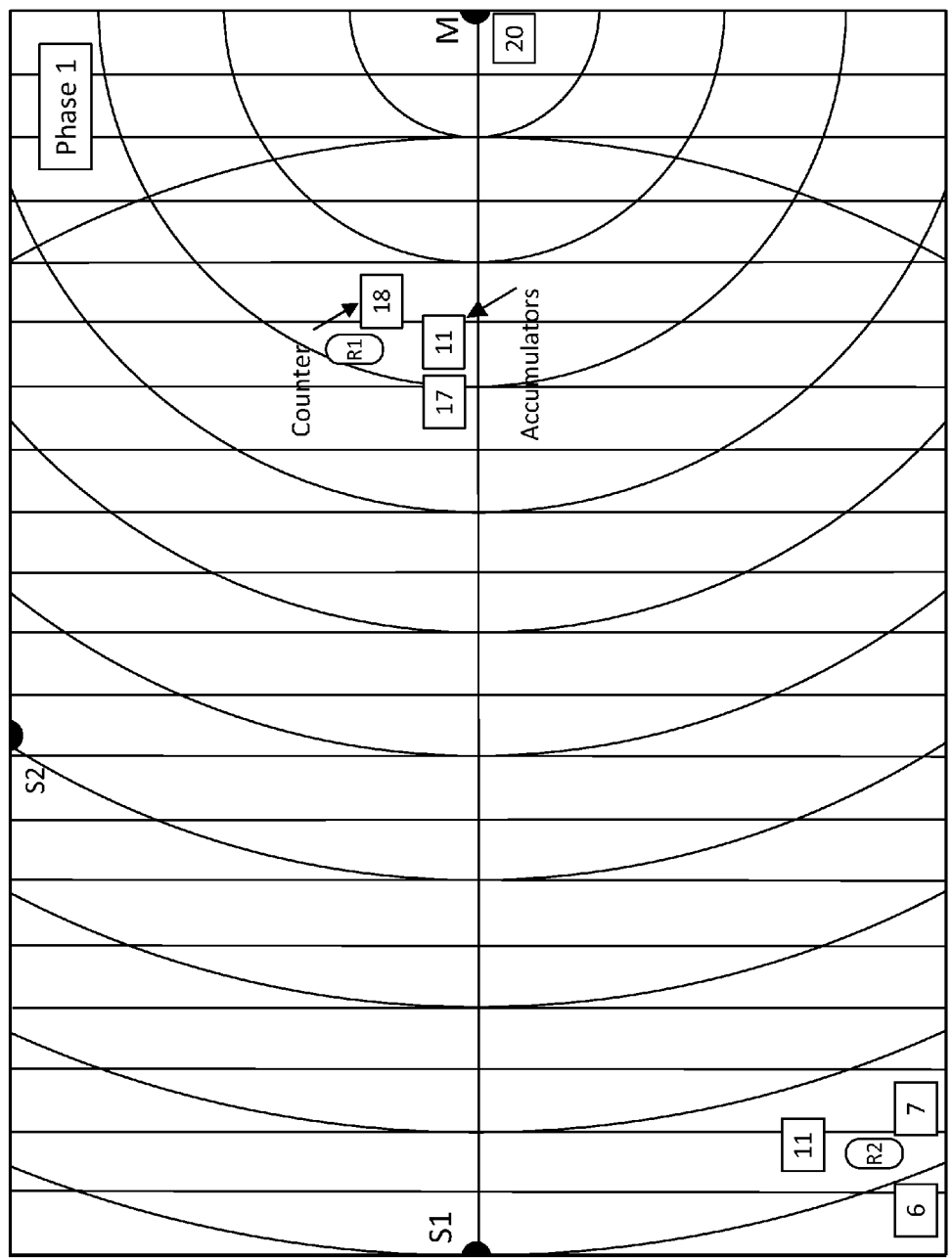
Figure 20:
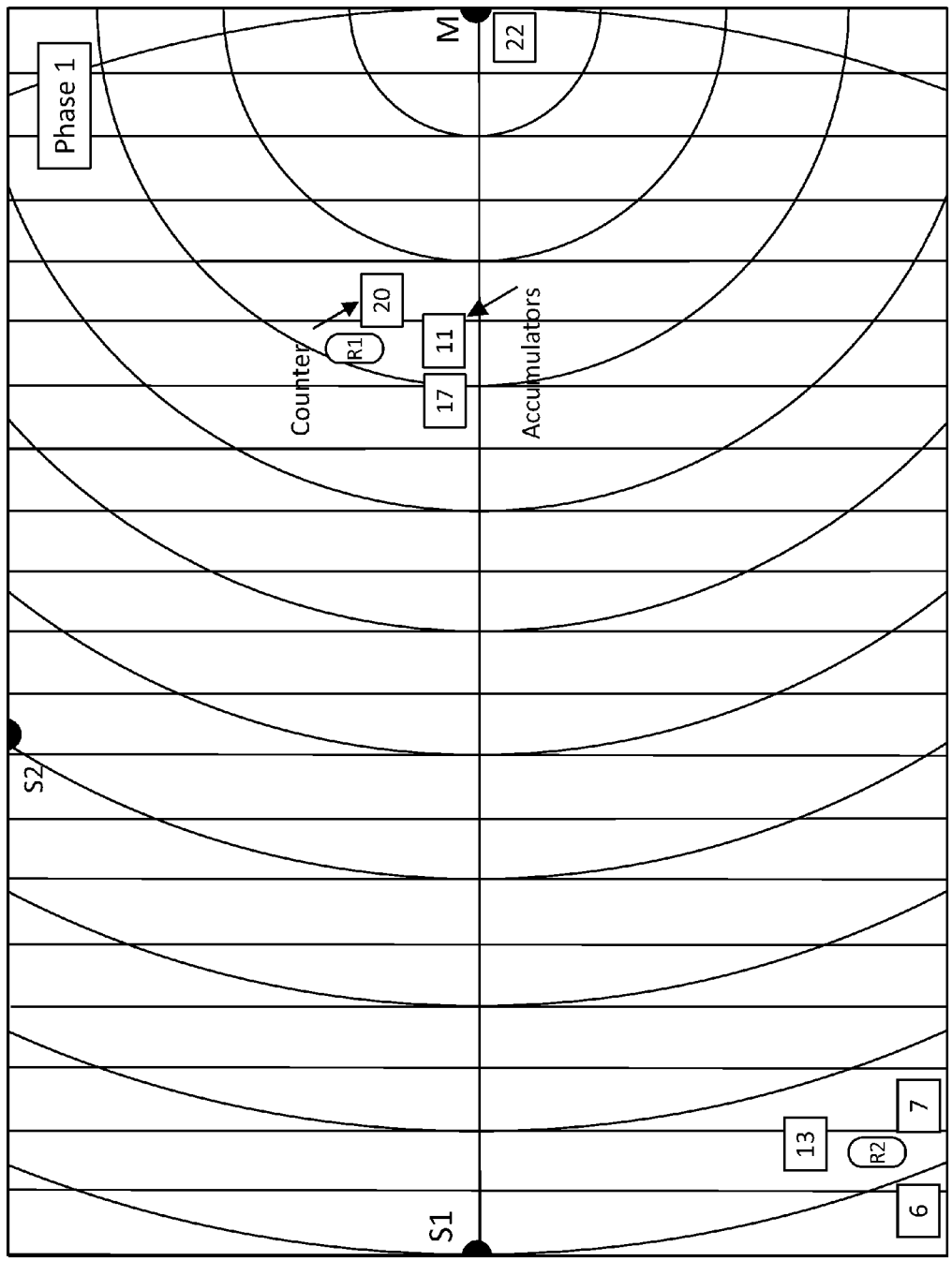

Referring now to the present invention in more detail with the preferred method for asynchronous DiD determination, FIGS. 10 through 20 illustrate a time progression of how the series of pulses propagates from the master device M and how the acknowledgement pulses propagate from the slave devices within the RTLS domain during the first pass. In FIG. 10, the number near the master device M is the number of pulses emitted by the master device M, and the numbers near the mobile client devices are their respective accumulated count of each pulse from the master device M. In FIG. 11, the mobile client device R1 detects the series of pulses from the master device M, and the accumulator for each slave device is activated for the mobile client device. In FIG. 14, the slave device S2 has phase locked and responded with its acknowledgement pulse. Likewise in FIG. 16, the slave S1 has independently phase locked and responded with its acknowledgement pulse. Finally in FIGS. 17 and 19, both acknowledgment pulses from the slave devices S1 and S2 have been received by the mobile client device R1, and both accumulators are disengaged by the mobile client device R1 with accumulated pulse counts of 17 relative to the slave device S1 and with accumulated pulse counts of 11 relative to the slave device S2. This effectively ends the first pass for the mobile client device R1. However, the counter for the mobile client device R1 continues to increment until the transmission of the pulses from the master device M ends for the first pass, and monitoring for acknowledgement pulses from the slave device S1 and S2 is rearmed by the mobile client device R1.

Figure 21:
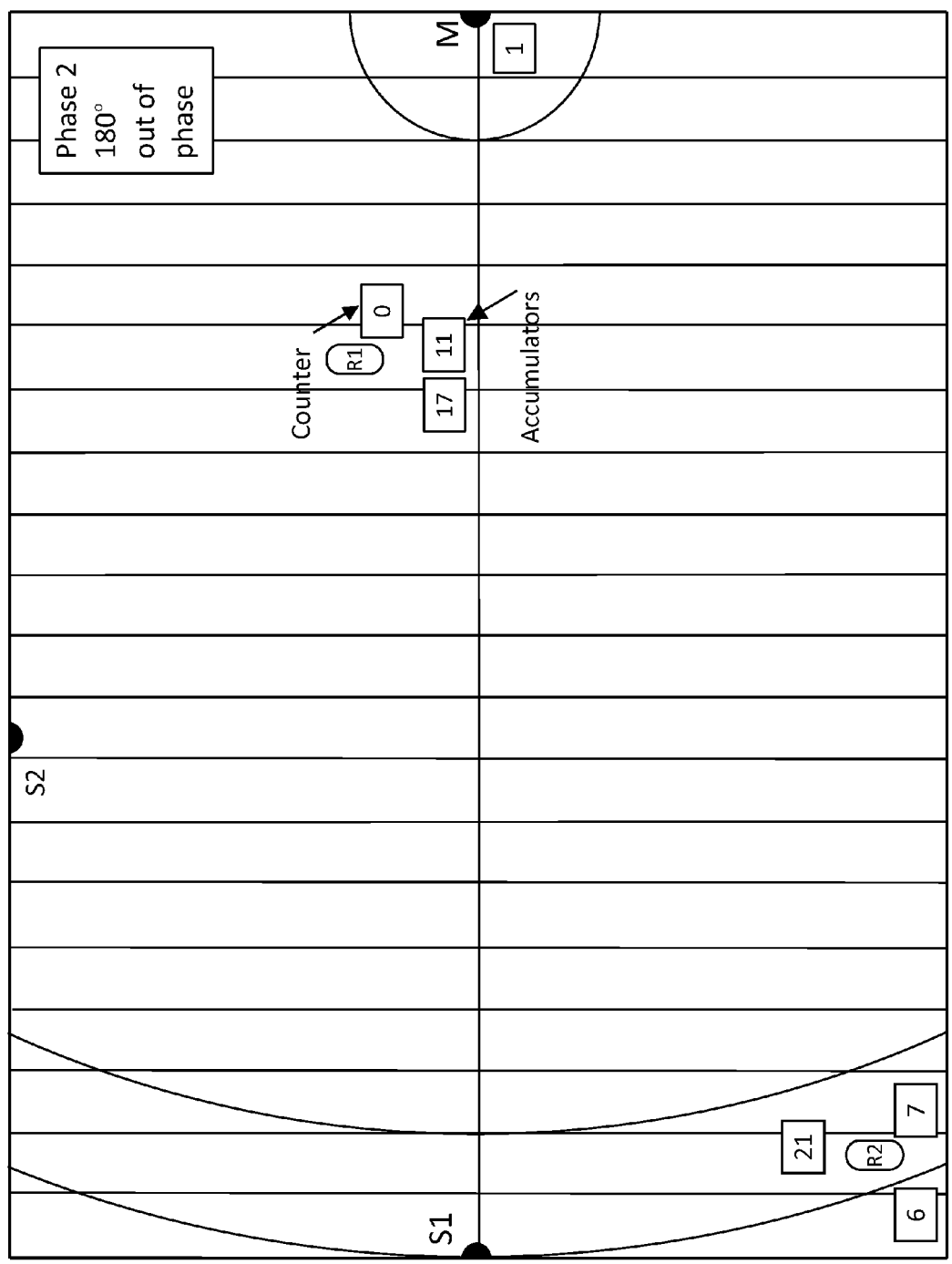
Figure 22:
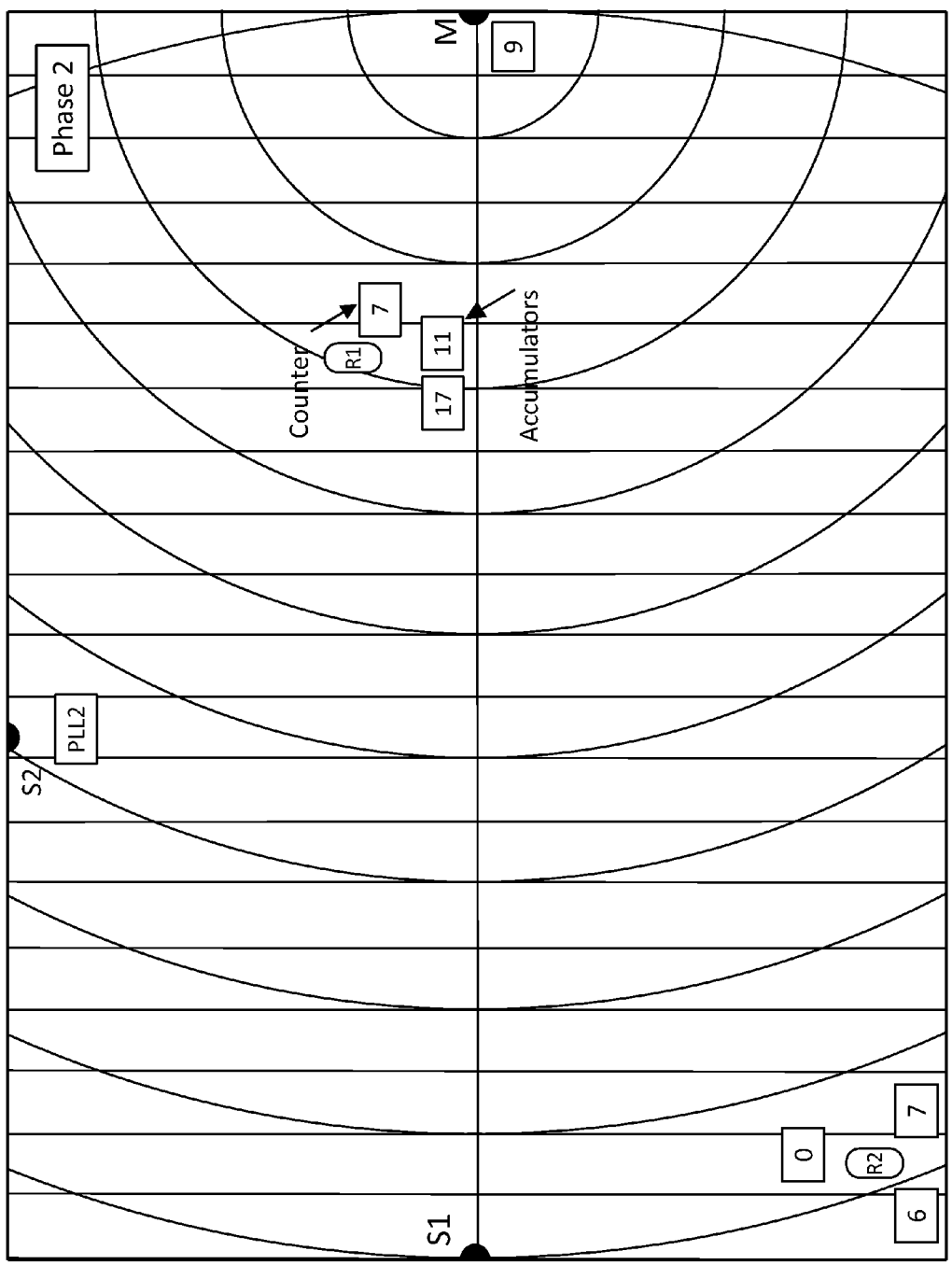
Figure 23:
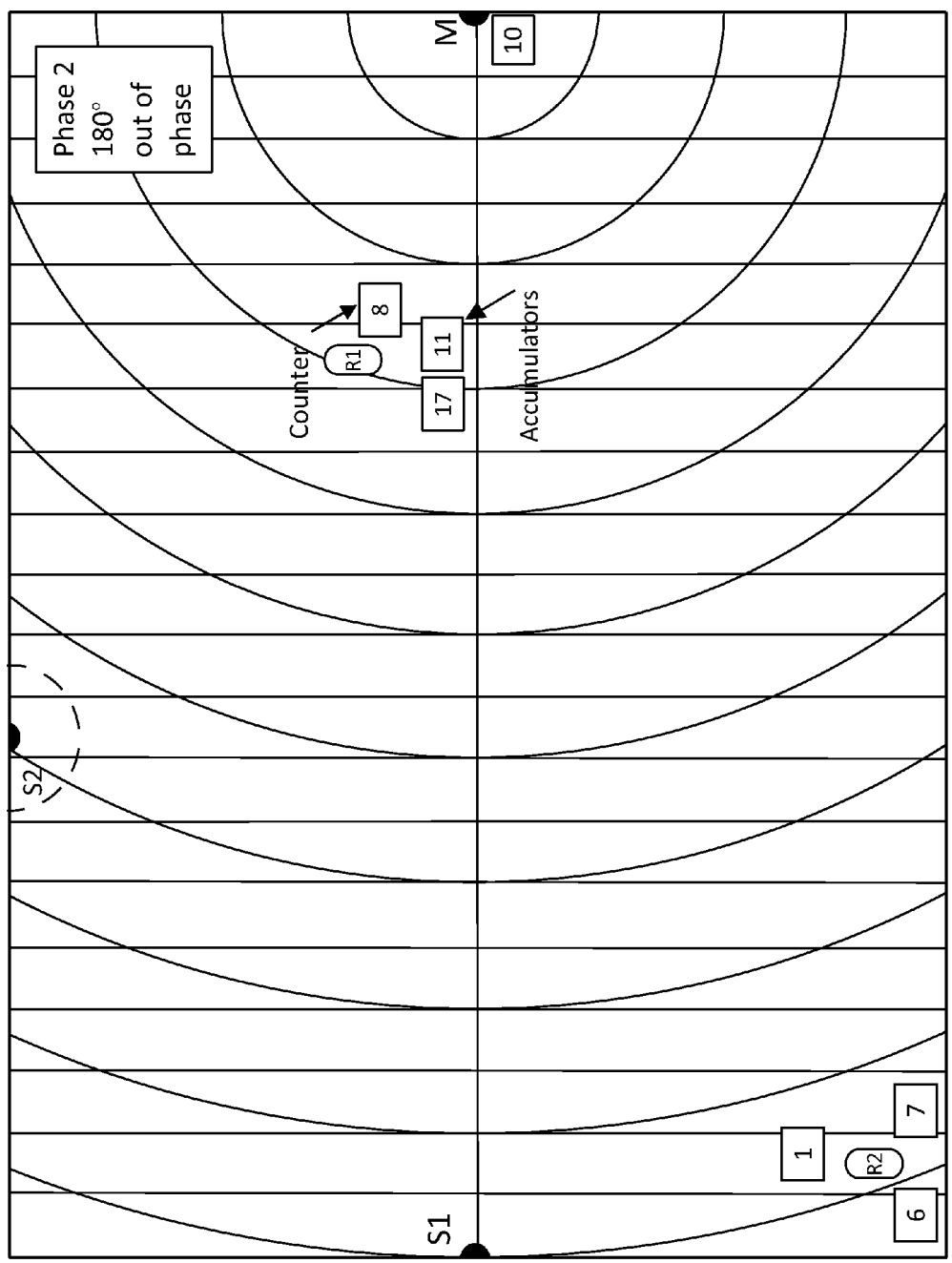
Figure 24:
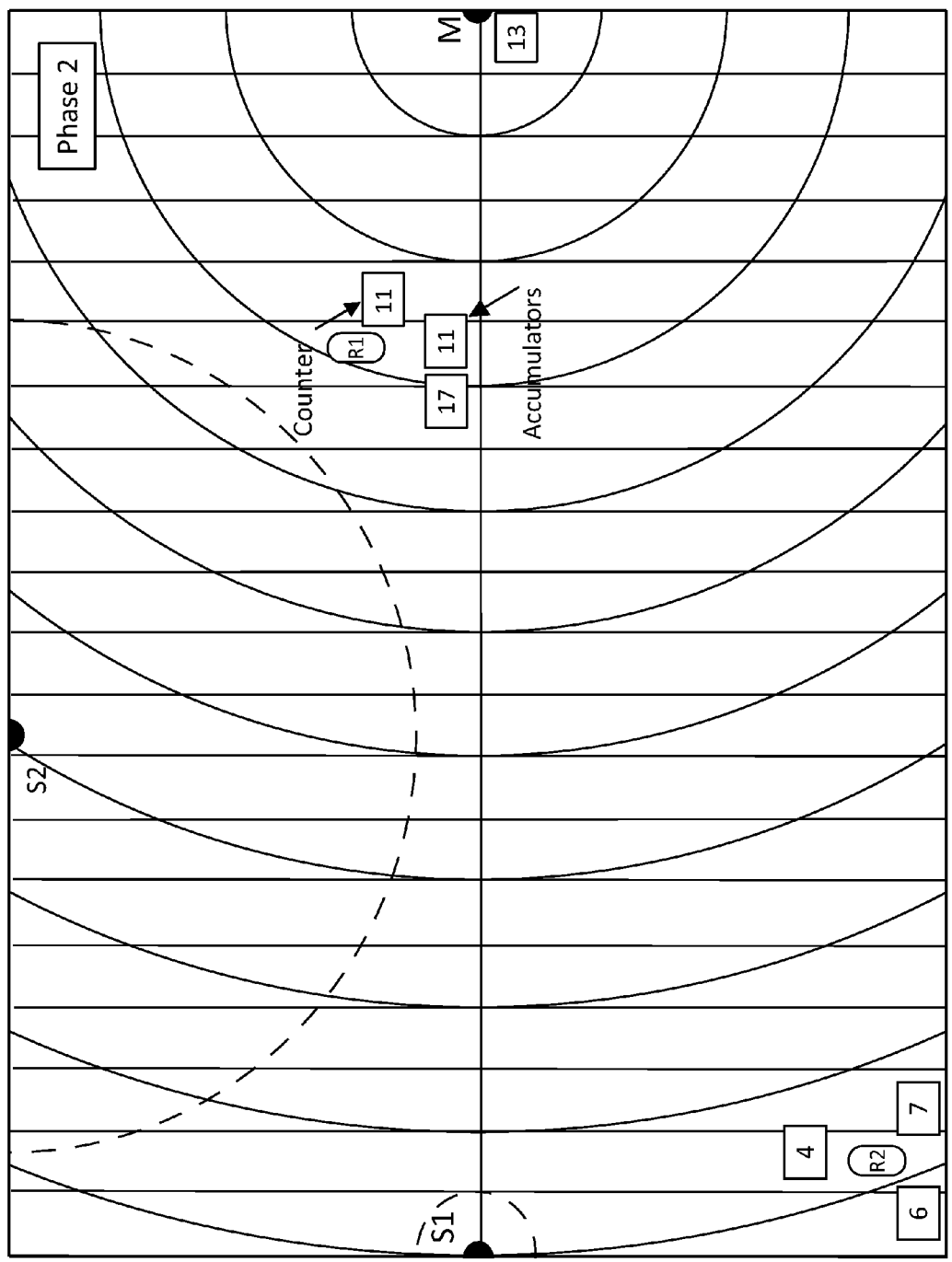
Figure 25:
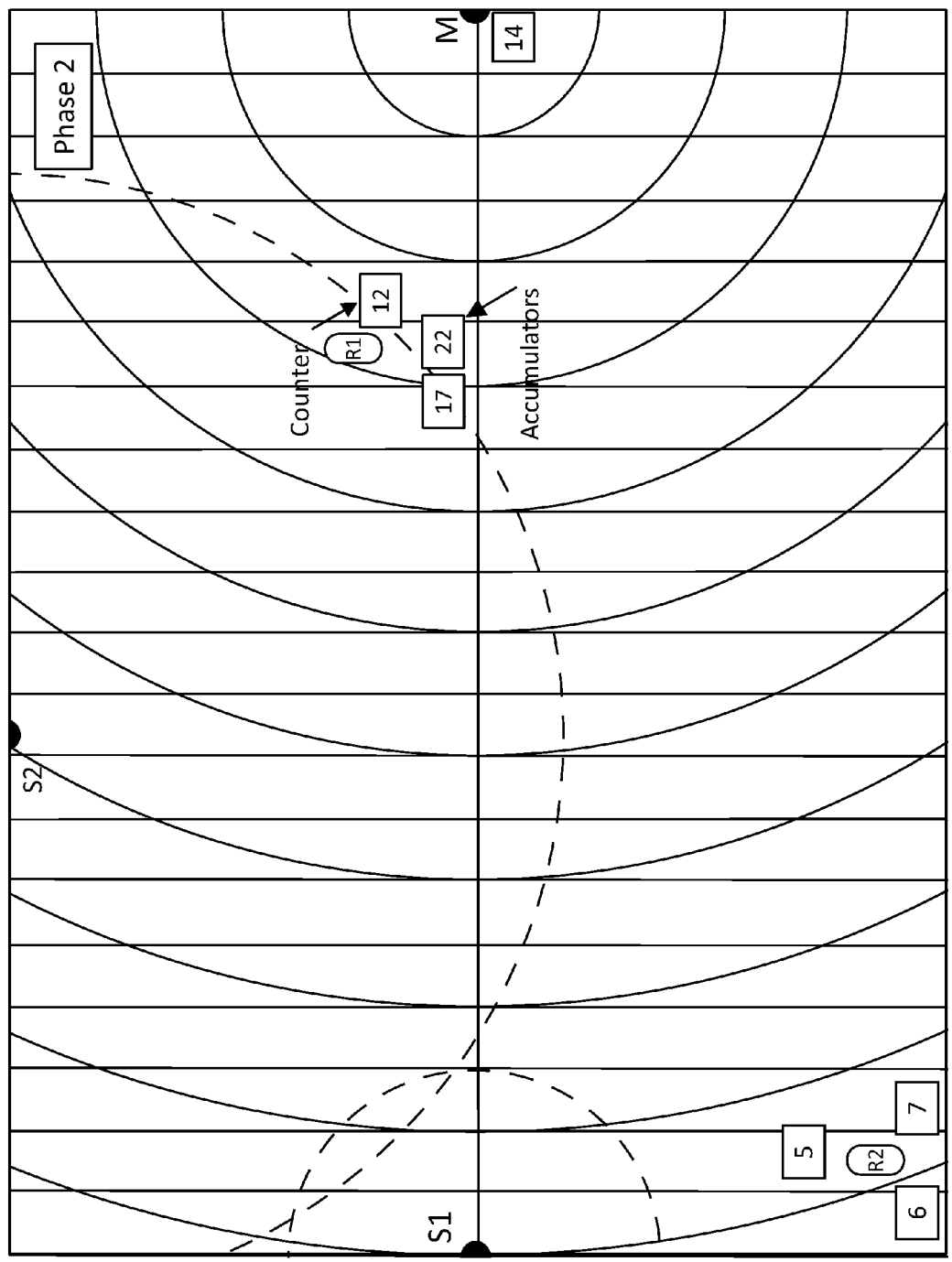
Figure 26:
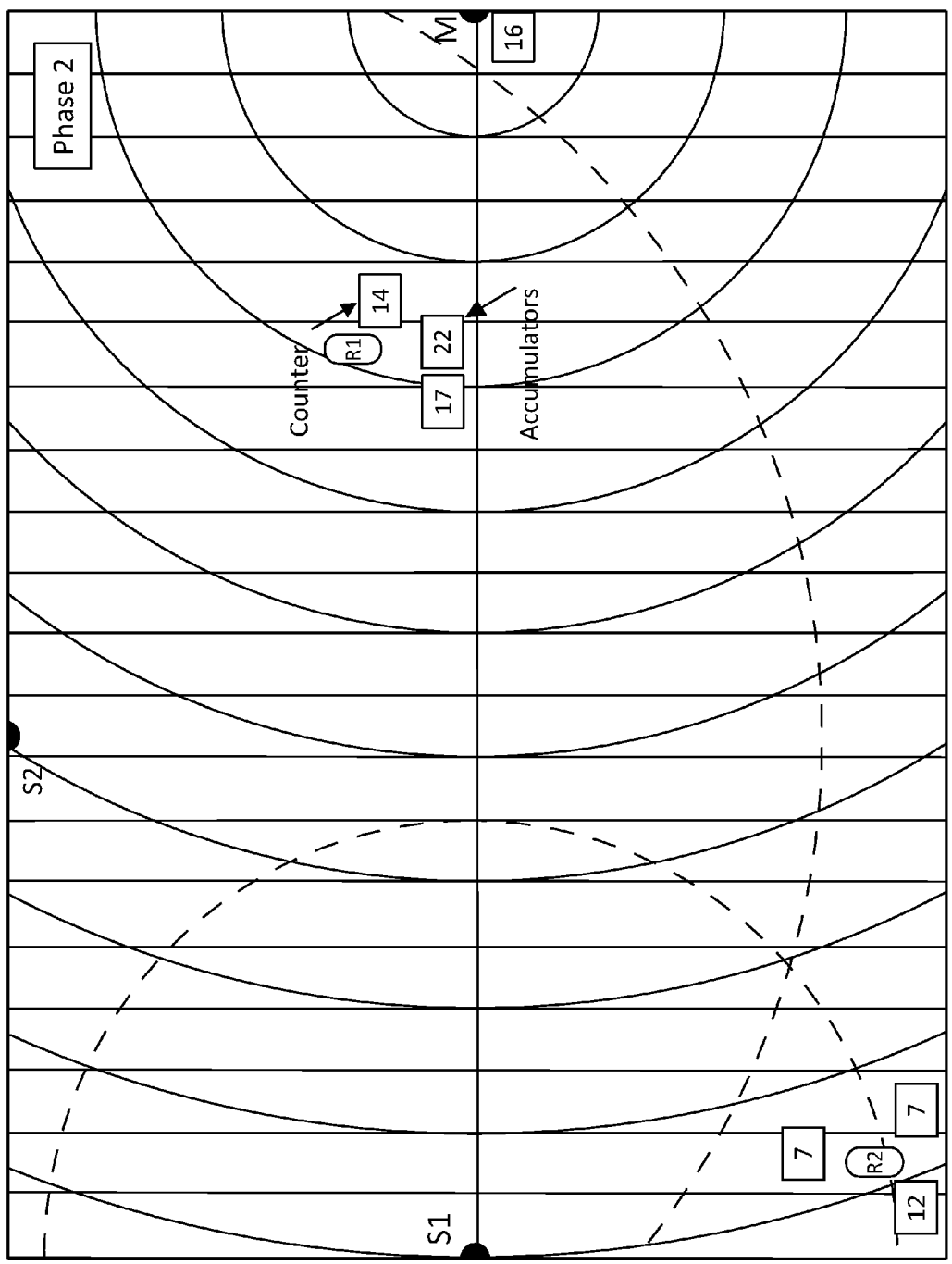
Figure 27:
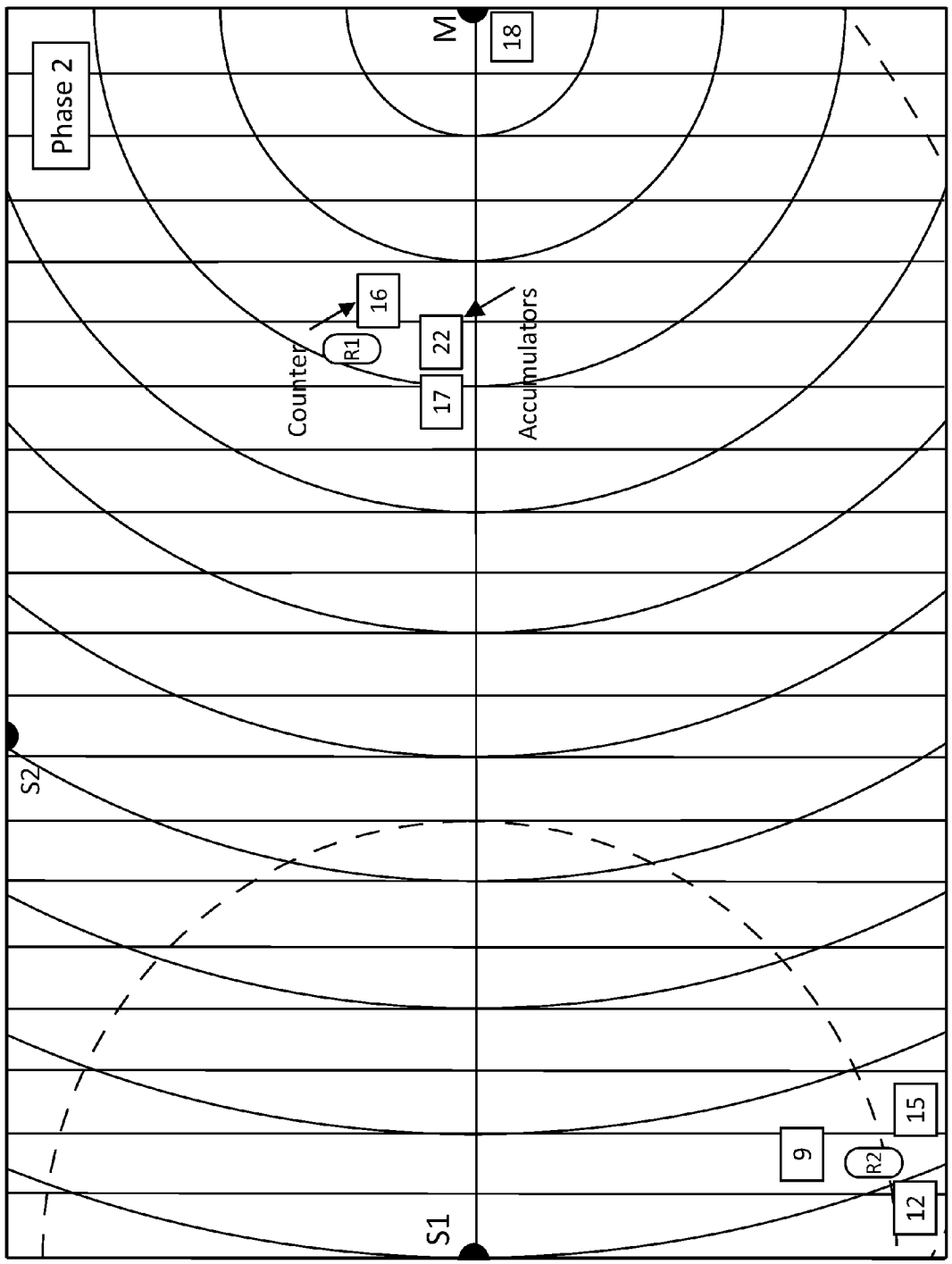
Figure 28:
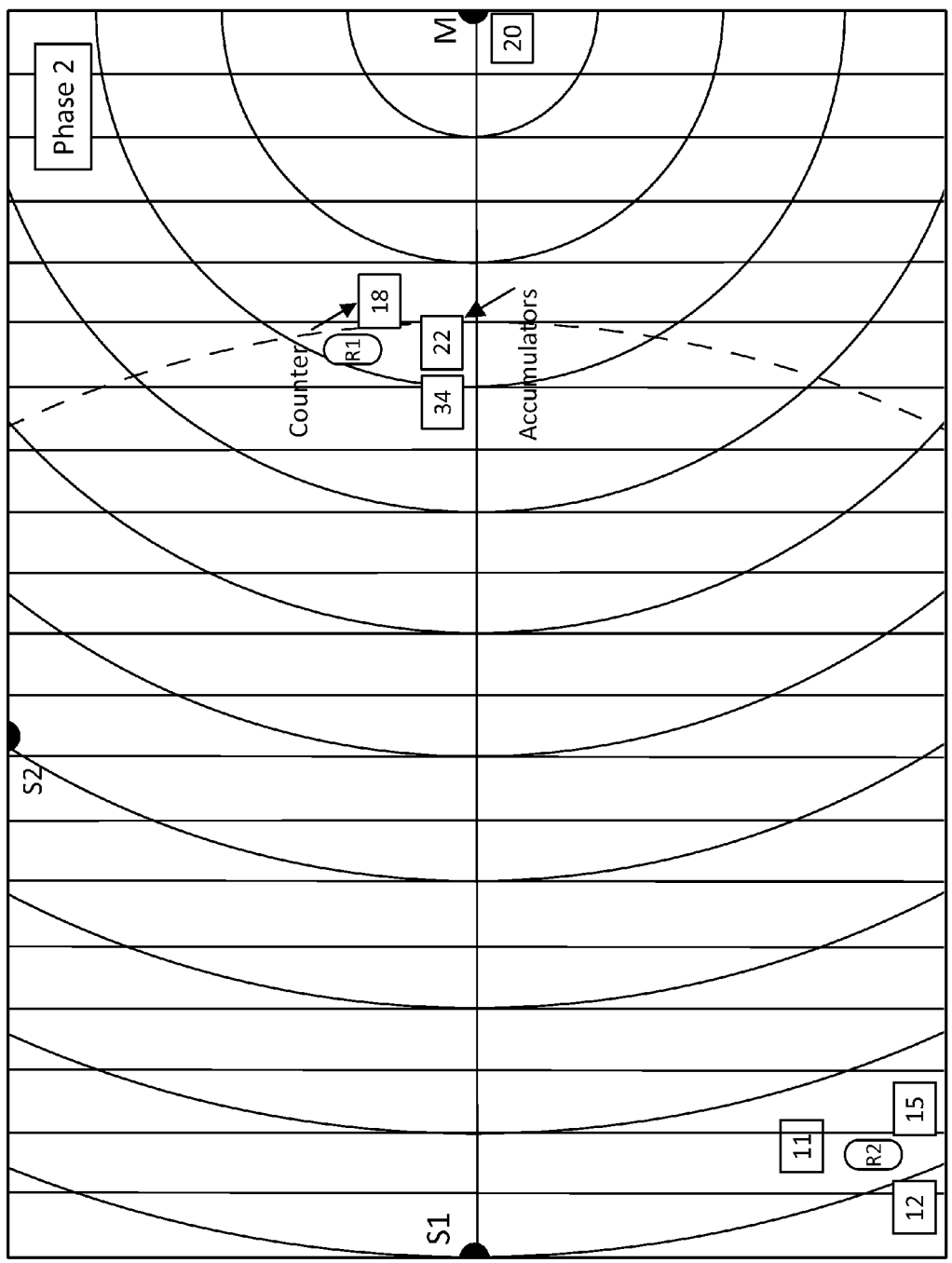
Figure 29:
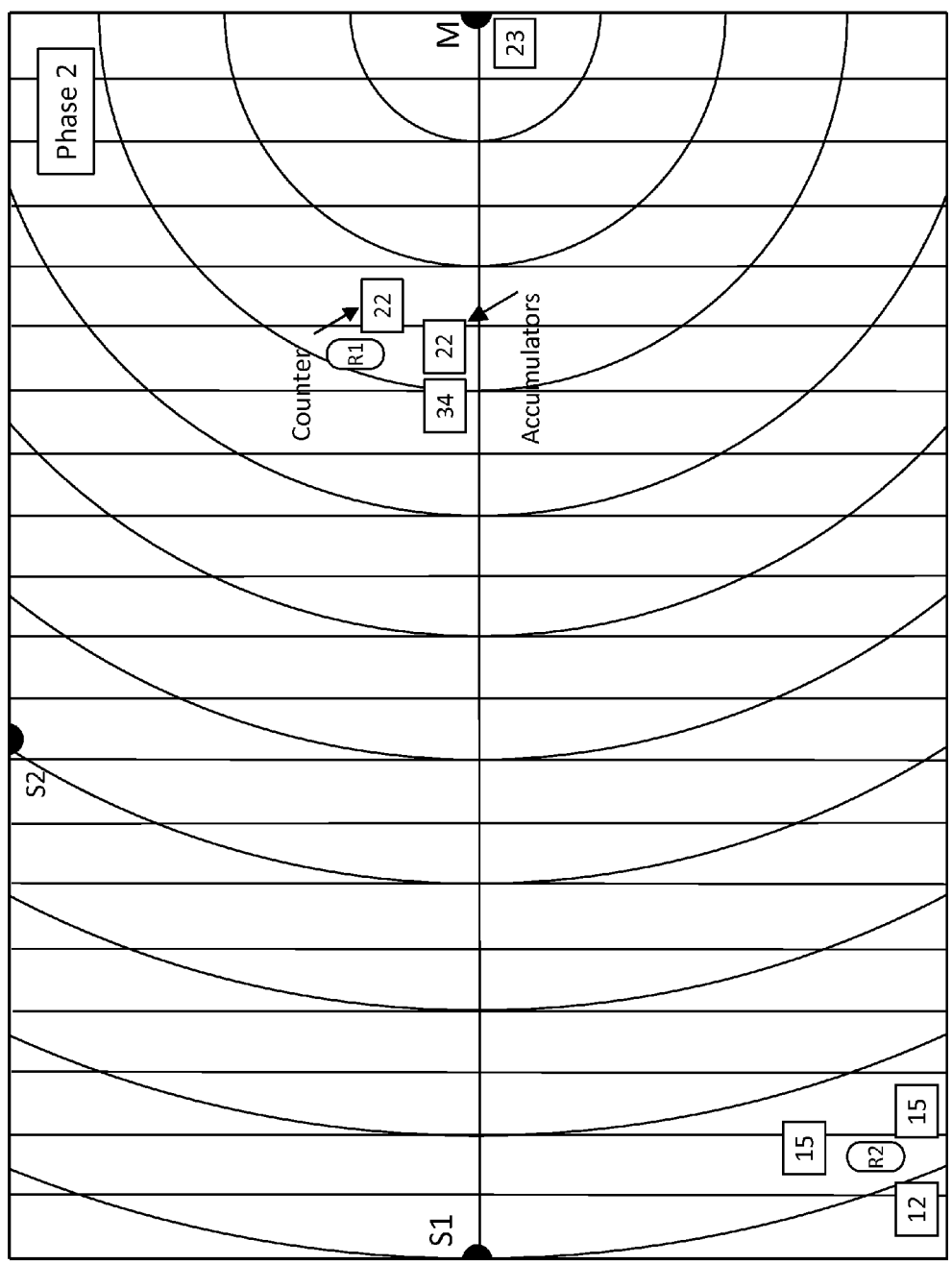
Figure 30:
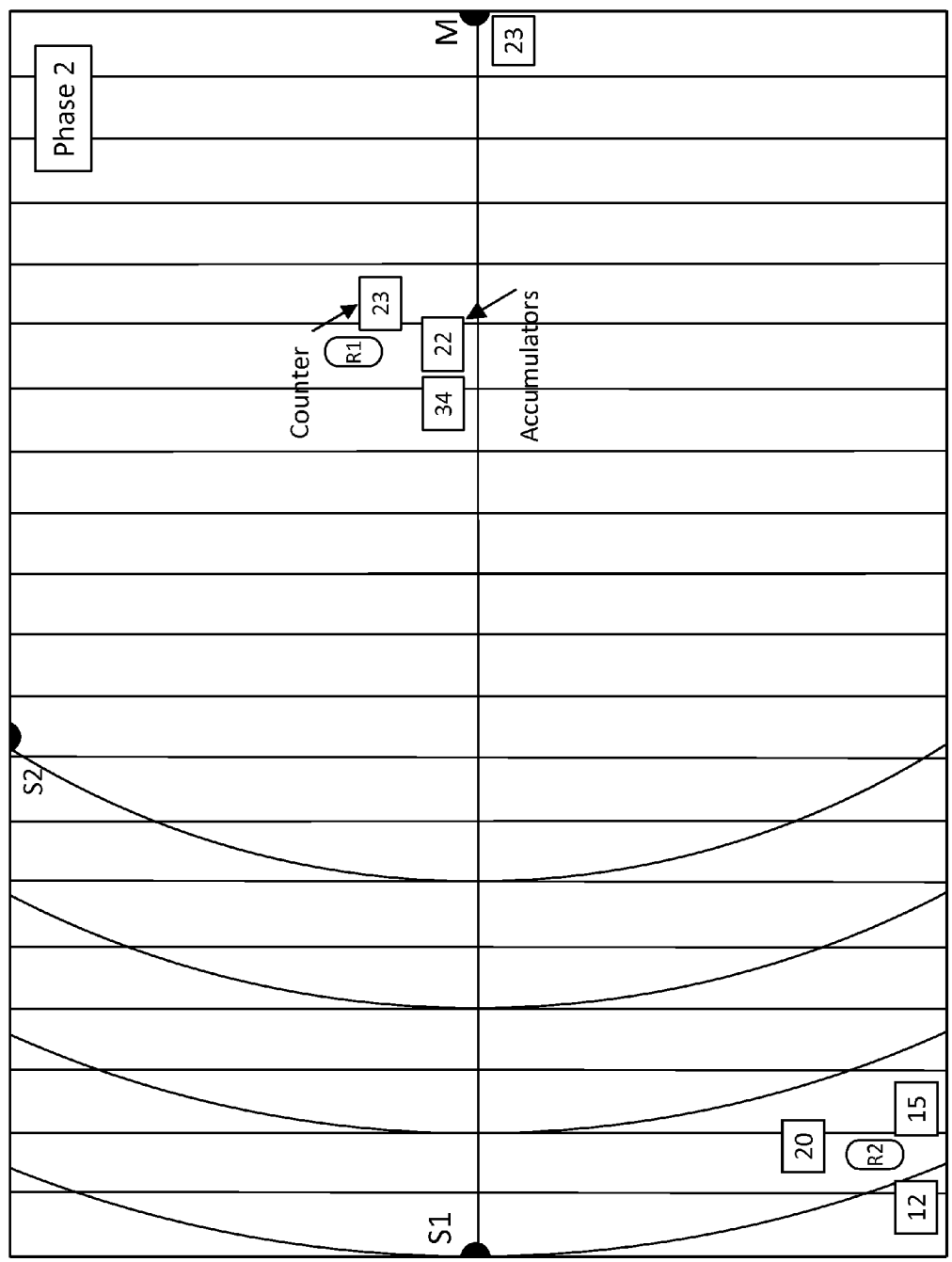
Figure 31:
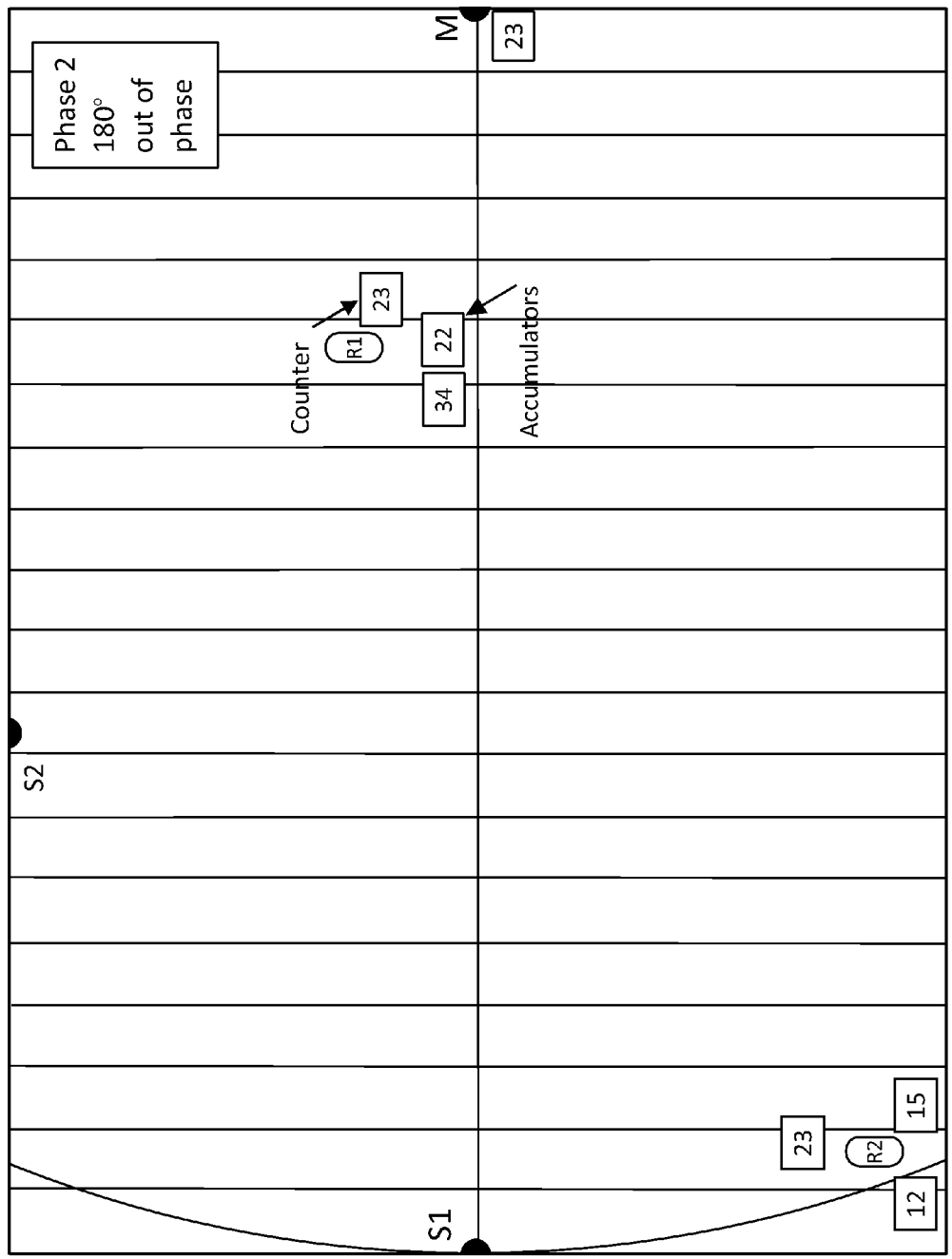
Figure 32:
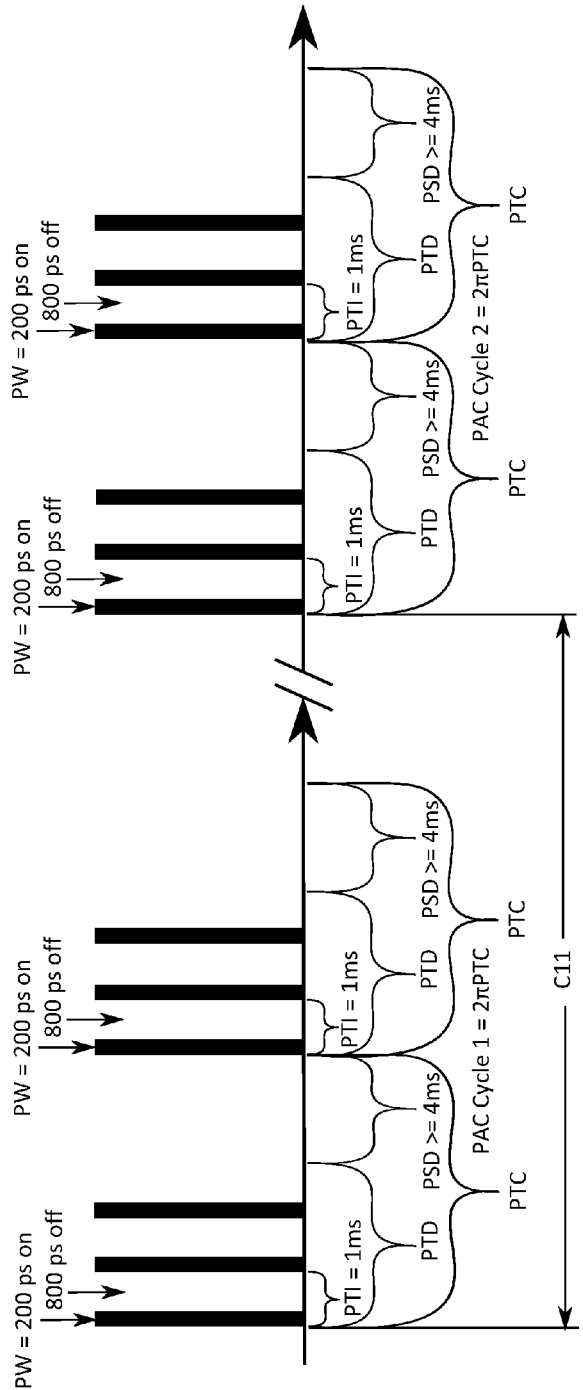
FIG. 32 is a pulse interval diagram.
Figure 33:
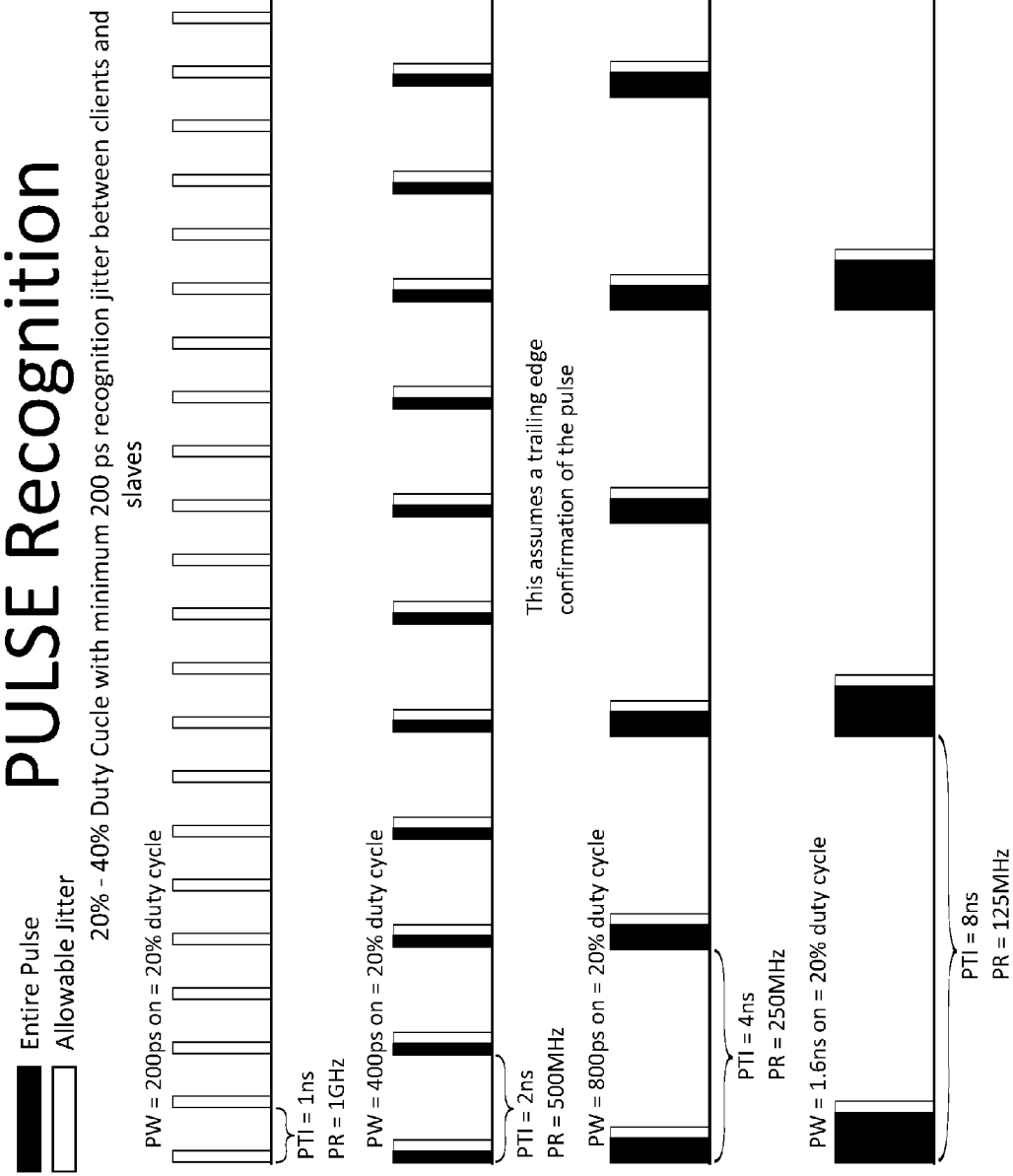
FIG. 33 is a pulse recognition diagram.
Figure 34:
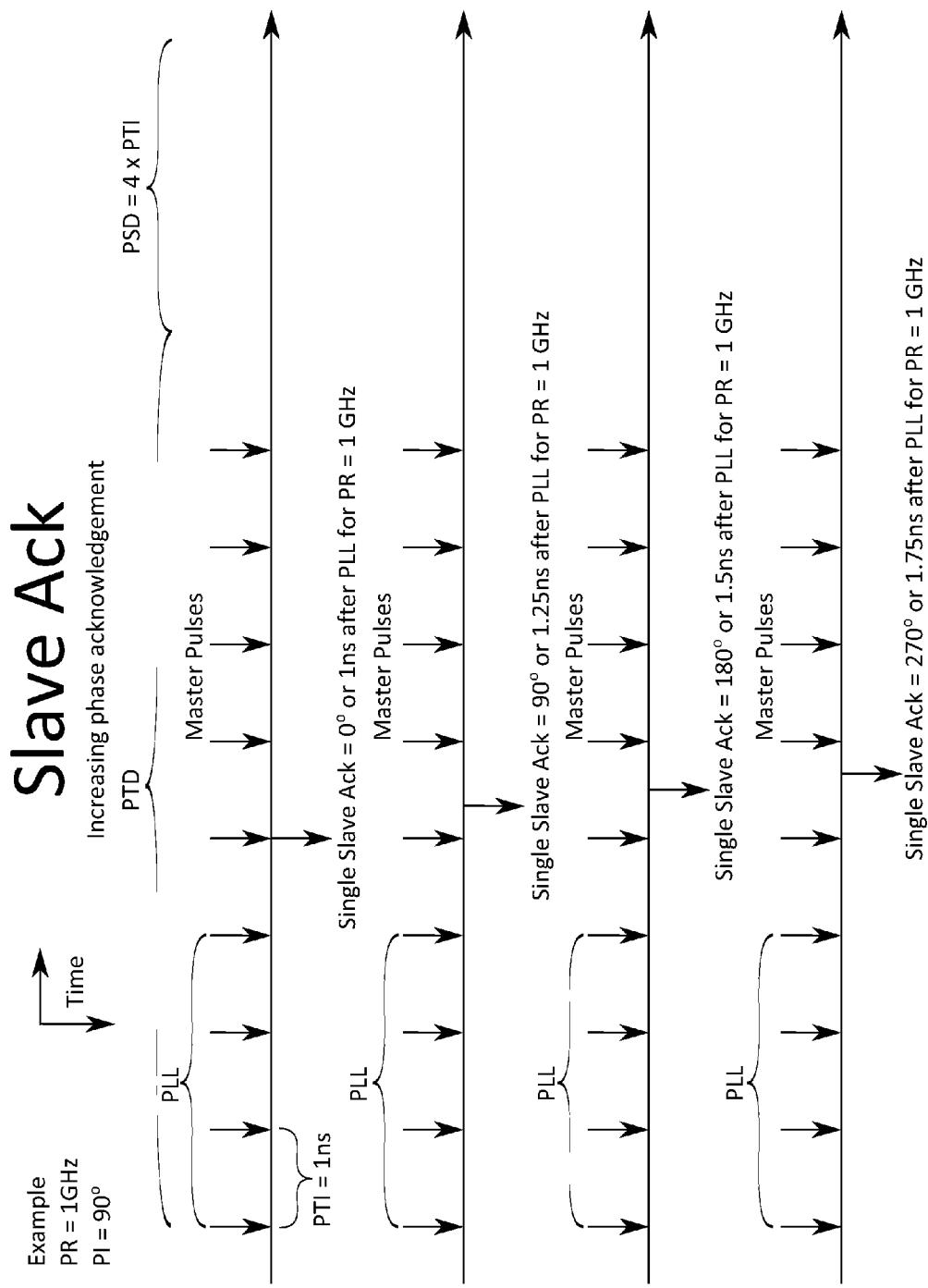
FIG. 34 is a slave acknowledgement diagram with increasing phase.
Figure 35:
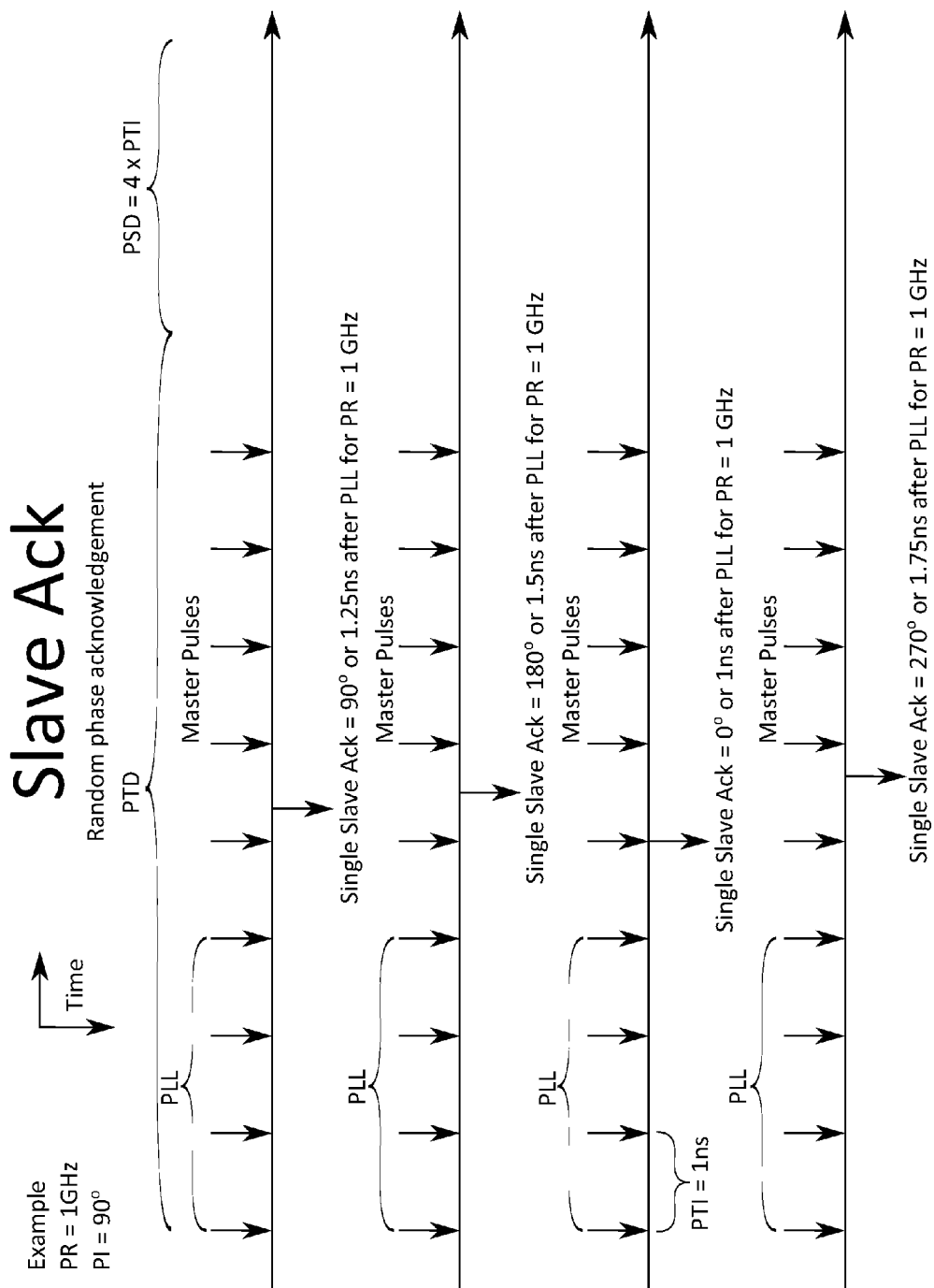
FIG. 35 is a slave acknowledgment diagram with random phase.
Figure 36:
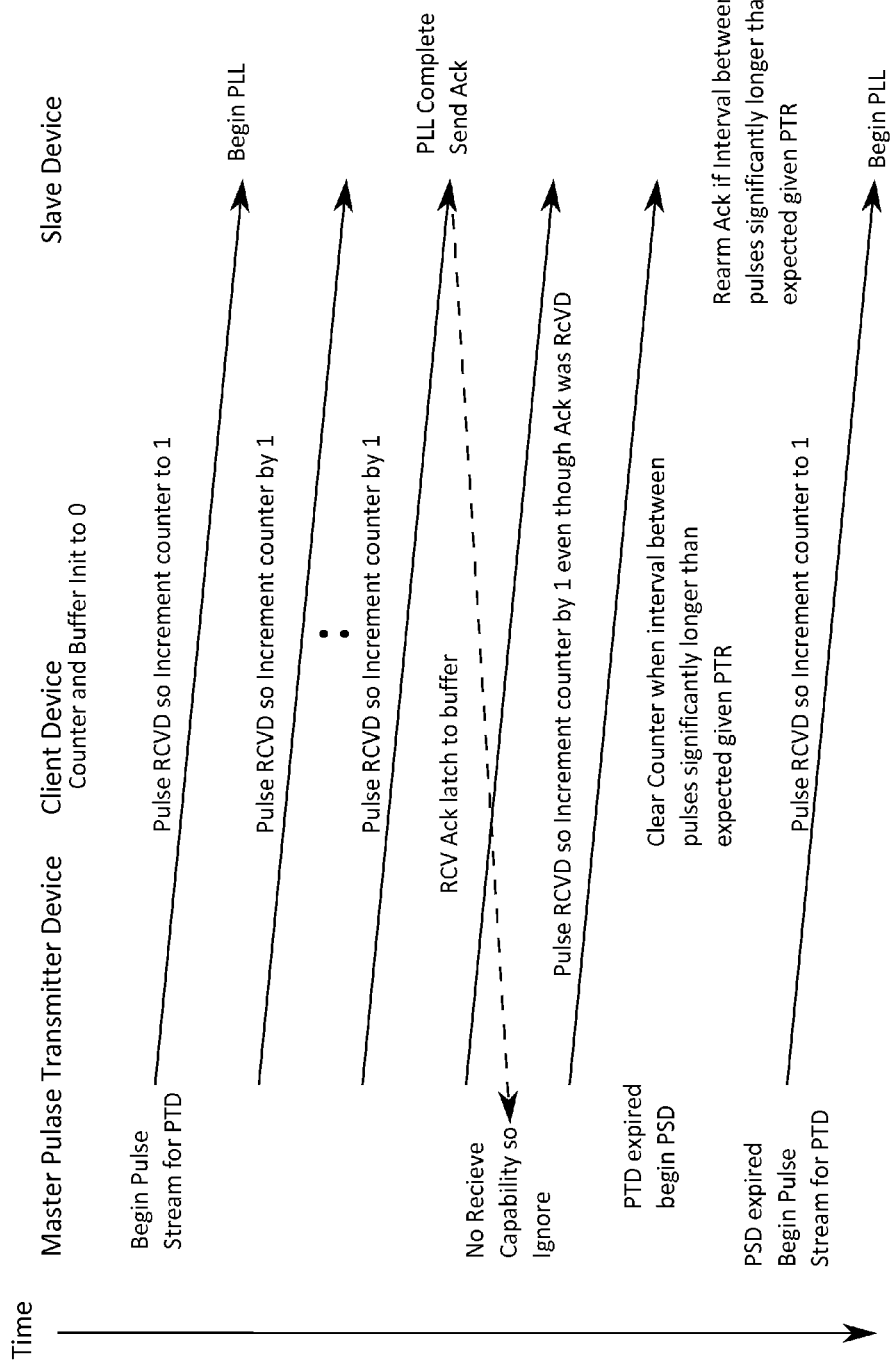
FIGS. 36 through 39 show the signal interaction (i.e. Signal ladder diagram) between master, slave, and client element types over the four pulse transmit cycles of a multi-phase DiD determination process as described in the present invention with a phase increment of 90°.
Figure 37:
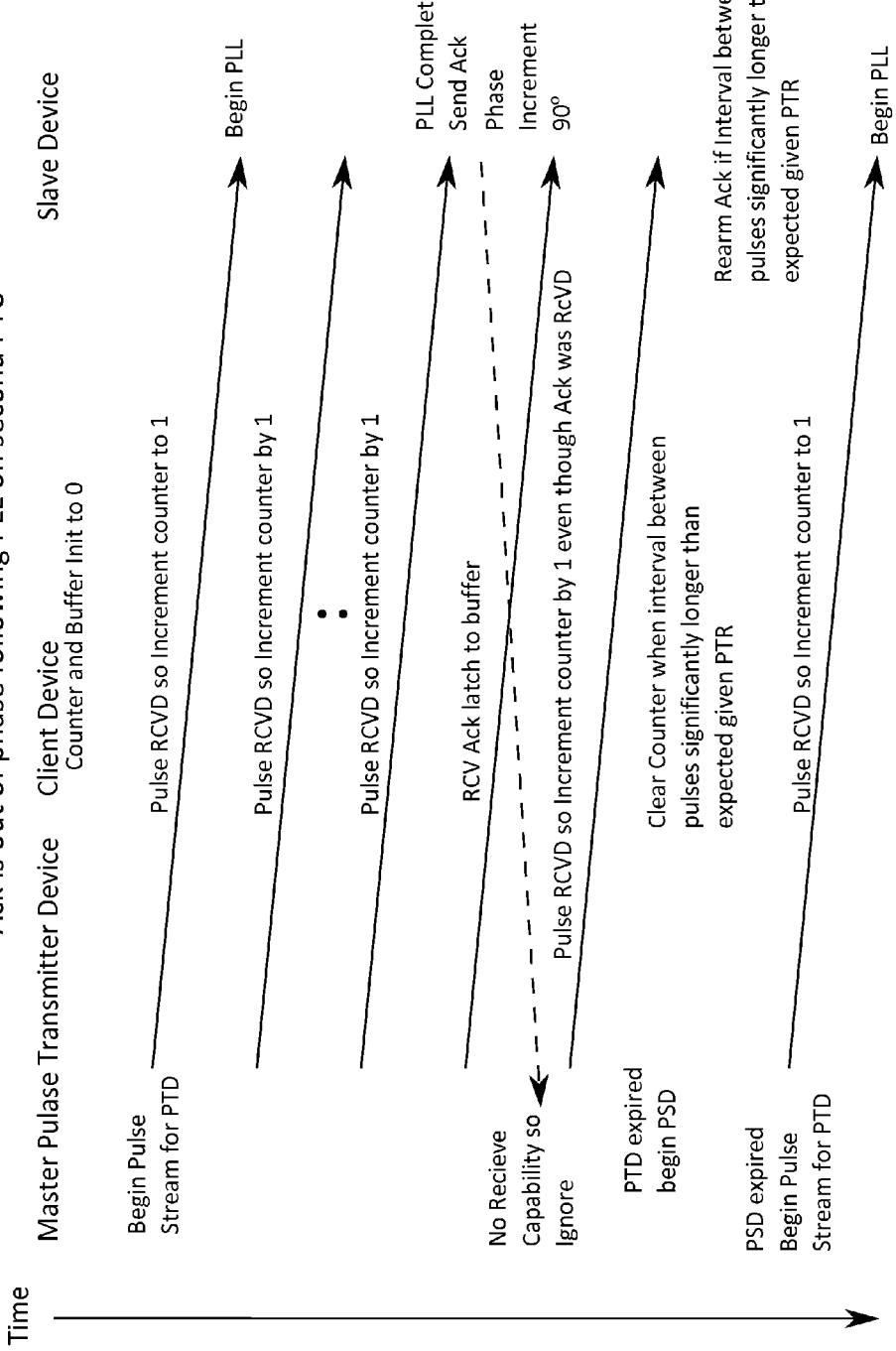
Figure 38:
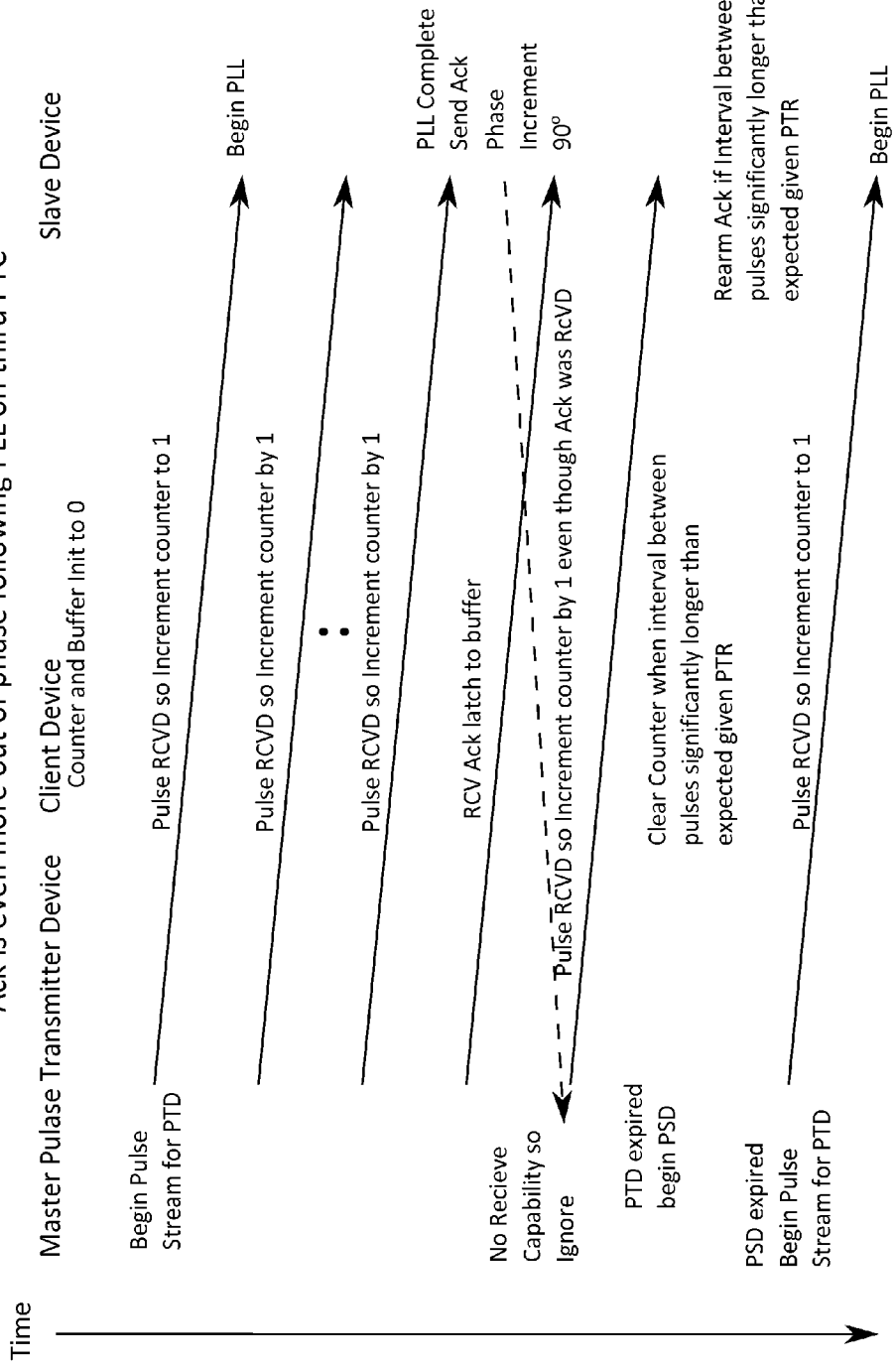
Figure 39:
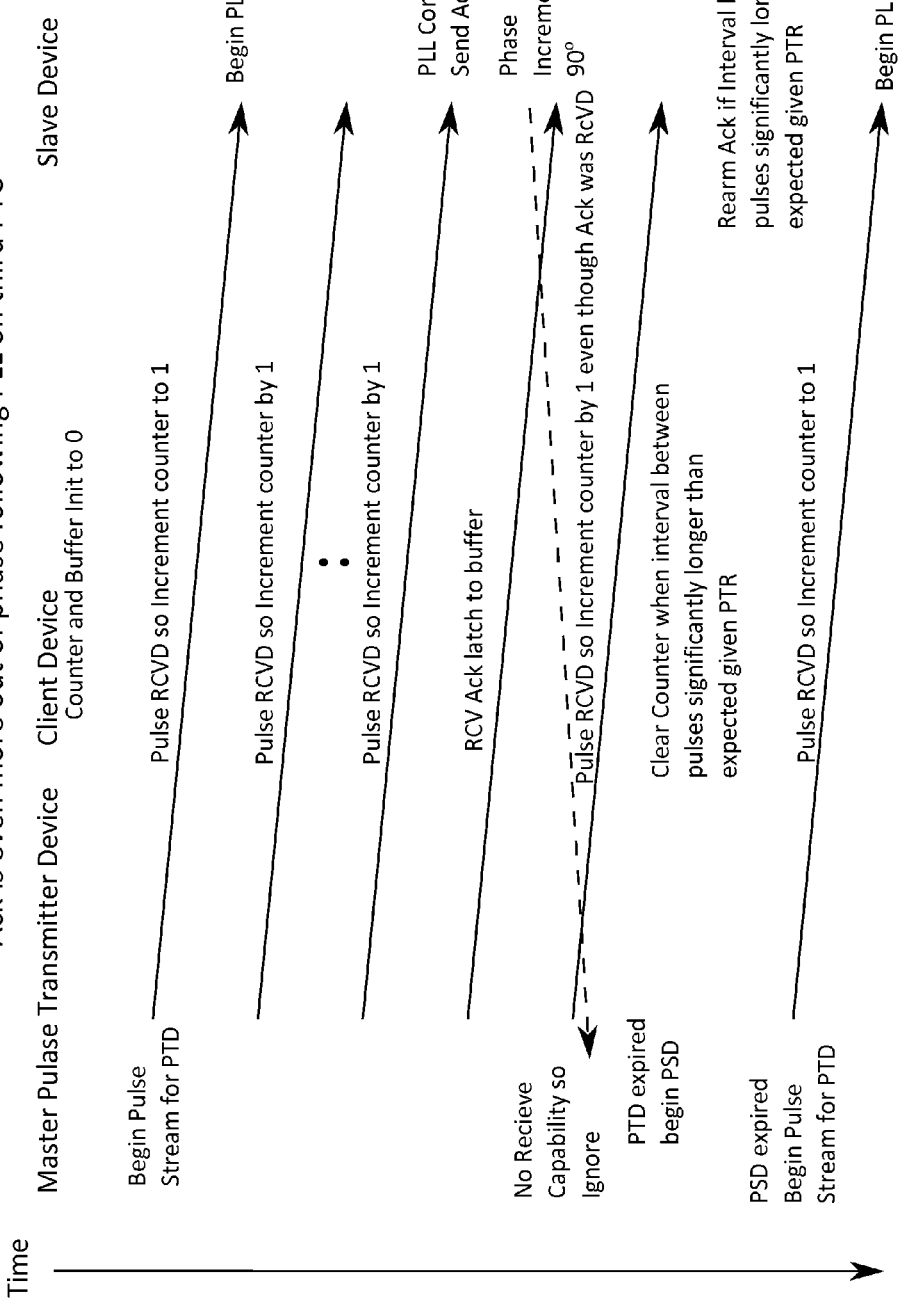

Referring now to the present invention in more detail with the preferred method for asynchronous DiD determination, FIGS. 21 through 31 describe a time progression of how the series of pulses propagates from the master device M and how the acknowledgement pulses propagate from the slave devices within the RTLS domain during the second pass. The waiting time between the first pass and the second pass (or between any number of passes) is insignificant as long as the waiting time is short enough such that the mobile client device has not moved a significant amount. If the present invention uses RF or light as a pulse carrier, then the waiting time is negligible for slow moving objects carrying the mobile client device such as humans on foot or objects on conveyors and can likely be measured in microseconds. If the present invention uses sound as a pulse carrier, the waiting time becomes more critical. In FIG. 21, the second pass begins with the master device M by again transmitting a constant stream of pulses. Similar to the first pass, each slave device will phase lock to the stream of pulses from the master device M and transmit an acknowledgement pulse. However, during subsequent passes during a phase accumulation count (PAC) cycle, the slave device will respond out of phase, which is set at a predefined phase increment. The slave device can respond out of phase only because the slave device has phased locked to the series of pulses incoming from the master device and not because the internal clock of the slave device is synchronized with the master device M. The preferred method will keep the count correct at the accumulator of the mobile client device no matter how many passes and phase shifts are required for the proper resolution.

In FIGS. 21 through 31, both slave devices S1 and S2 during the new pass transmit an acknowledgement pulse that is 180 degrees out of phase from the previous pass. The order in which the phase-incremented acknowledgement pulses are received by the mobile client device is inconsequential to the mobile client device as long as all of the phase increments are used and used only once during a PAC cycle. Moreover, the mobile client device is completely unaware of any phase shifting of the acknowledgement pulses. Therefore, each phase increment can be random and independent for each slave device without affecting results received by the mobile client device. Consequently, the mobile client device and the master device are kept simple with respect to the preferred method, and a slight complexity is added to the slave device.

The preferred method for determining a single or multiple asynchronous DiD's using a multi-phased approach as outlined in FIGS. 10 through 31 is described in the following steps:

1. One master device M and one or more slave devices S are positioned within a designated RTLS domain. The slave device S1 or S2 can be either an active regenerator or passive signal reflector. The slave device is not limited to either of the aforementioned devices and can be any other device performing effectively the same functionality. However, for this example and FIGS. 10 through 31, the slave device is an active regenerator.

2. A master device M and its associated slave device(s) S1 and S2 may interact with an unlimited number of mobile client devices. The communication is always a unidirectional "one to many" relationship between the master-slave pair and an unlimited number of mobile roamer clients, which are listening to the signal from the master-slave pair.

3. On a regular predetermined positioning cycle interval and at a time "t(0-b)" relative to the mobile client device R1 or R2, the master device M will begin by transmitting a continuous series of pulses at regular and predetermined intervals known to the mobile roamer. The distance c is defined as the distance between the master device M and any particular mobile client device in terms of whole or partial pulse lengths. The master device M will continue transmitting pulses on its predetermined regular intervals for a fixed time period, which is equal to the time it takes the first pulse to reach the farthest slave device plus the time it takes to have its acknowledge pulse travel all the way back to the master device M. This allows the present invention to completely cover the RTLS domain with pulses from the master device M and worst case acknowledgement pulses from the slave device S.

4. At a time "t(0)" relative to the mobile client device R1 or R2, the mobile client device will receive its first pulse from the master device M. If the accumulator is not active when the first pulse arrives at the mobile client device, then the mobile client device will activate and reset of its internal accumulators and will set its common counter to a zero count. The relationship between the series of pulses and its particular master/slave pair can be determined through a number of different methods that include, but are not limited to, pulse carrier frequency, pulse carrier modulation, time slot, and sequential iteration.

5. For each subsequent pulse received by the mobile client device R1 or R2 prior to receiving an acknowledgement pulse from the associated slave device S, the mobile client device will increment its counter associated with that particular master-slave pair. While this method uses the series of pulses as a means to increment the counter, the present invention does not preclude using a local oscillator or digital timer to perform the same functionality even if they are somewhat less accurate. In fact, this derivation of the method is somewhat useful under certain circumstances.
6. At a time "t(c)" relative to the client mobile device R1 or R2, where the distance c is a known constant distance between the master device M and the slave device S1 or S2, the slave device will phase lock to the series of pulses from the master device M.
7. Following phase lock to the series of pulses for each slave device, the slave device will send an acknowledge pulse that is phase locked to the series of pulse from the master device M by the next appropriate predefined phase increment. There are many common methods that can be used by the mobile client device in order to distinguish the acknowledgement pulse from each slave device.
8. At a time "t(d+PLL)" relative to the mobile client device R1 or R2, the acknowledgement pulse from the slave device S1 or S2 will arrive at the mobile client device, and the mobile client device will latch the current value of the counter into a accumulator dedicated to that particular slave device. The relationship "d=a+c−b" is previously defined in FIGS. 6 and 7, and the PLL is previously defined as a known time for phase lock for the slave device.
9. When the master device M completes transmitting the series of pulses, the master device M will determine if the current pass is the last pass of a predetermined number of passes based on the phase increment used in the current pass. If the current pass is the last pass, then the master device M will go to sleep for the predefined transmit sleep duration (TSD) period, which preps the present invention for the next asynchronous DiD determination. At the same time, both the mobile client devices R1 and R2 and the slave devices S1 and S2 will know the end of the PAC cycle by detecting the extended TSD time delay. The slave devices will reset their phase increments while the mobile client devices will clear their counters and make their new DiD values available for upper layer applications. However, if the current pass is not the last pass, then the master device M will go to sleep for the predefined pulse sleep duration (PSD) period. The master device will then begin a new pass by initiating a new pulse transmission cycle (PTC) and steps 3-9 will be repeated during the new PTC.
10. At the end of each PAC cycle, this 10-step process described above will repeat indefinitely.

For the present invention, the preferred method of phase-shifting pulses can achieve any resolution of accuracy by using smaller increments while phase shifting and thereby increasing the number of passes. Since light travels at roughly 11.8 inches per nanosecond, a single pass across a 1000 foot long room would only take 2000 nanoseconds or 2 microseconds. As the distance between pulses increases, the actual width of each individual pulse becomes less significant as does multipath issues since the count is level triggered. Consequently, the exact arrival time of the pulse is not nearly as significant as in a time-stamp based system because passes can be added as pulse intervals are increased. Even at 1-MHz pulse intervals, a 10-GHz resolution can be obtained in 10,000 passes at 2 microseconds per pass or just 20 milliseconds over a 1000 foot linear space. The 10-GHz resolution would provide less than one inch DiD accuracy, which is a significant improvement over the current technology in the field. This is an extreme example but indicates the capability of the preferred method of the present invention. More likely, the pulse interval should be 100 MHz or faster, which would reduce the DiD recognition time to just 200 microseconds instead of 20 milliseconds in the same RTLS domain. Potentially, there is no reason why a single master device cannot simultaneously provide pulses to multiple slave devices.

The end result of the preferred method is a set of raw pulse counts that is independently accumulated by each mobile client device over several passes and from several master-slave pairs independently. However, the set of raw pulse counts can be normalized based on the distances between their associated master-slave pairs and can then be used in many different ways. Another way to utilize the set of raw pulse counts is an asynchronous DiD equivalent measurement to TDOA for multilateration (also known as hyperbolic positioning) algorithms that determines a client-aware local position. Another way to utilize the set of raw pulse counts is to send the set of raw pulse counts to a server over a LAN/WAN network for server-aware processing.

The advantages of the present invention include a method for asynchronous DiD determination that is simpler than previous methods in terms of system development and in terms of deployment and cost of ownership while maintaining a higher potential for location accuracy. The simplicity of the preferred method allows the present invention to penetrate the client-aware local real-time location market with a small low power footprint. Barriers exist in this market because of the inherent small mobile footprint, power, and diversity in today's devices. The device used to implement the present invention could easily be placed inside a mobile SIM, a smart card, or an active ultra-wide band (UWB) RFID. In comparison, other companies have already integrated much more complicated radios and protocols into SIM, smart cards, and UWB RFID's. This includes ZigBee, Bluetooth, and Wi-Fi radios, all of which are significantly more complicated than the requirements of the preferred method and all of which have been proposed for or are currently being used for real time location systems (RTLS). Another advantage of the method in the present invention is that this method works quickly and to a high resolution. Using very short pulses over a 2.4G carrier, even 100-MHz pulse intervals could require only a few milliseconds to complete multiple DiD readings within a 1000 square foot room for every implementation device in the room without limitation. Moreover, because the pulses are spread far apart and are being counted instead of being strictly timed, leading edge determination issues that are needed establish a precise time stamp of arrival are eliminated regardless of signal strength. Unlike GPS, which may require minutes of training in order to synchronize the clock for a client device to the stratum-1 clocks of the global GPS satellite system, no training and relatively little time on the order of nanoseconds is required for phase lock of the slave device to the series of pulse from the master device. In addition, no time is required by the client device, which means the time required for a client device to join or switch positioning domains is virtually instantaneous on a PAC cycle boundary. Further, multipath on the pulses are easy to filter out and virtually inconsequential as long as the multipath distortion does not bleed completely across interval boundaries.

In the broadest sense, the present invention is a method for enabling a broad range of both server and client-aware local RTLS based applications at a price point, where these applications can gain broad market acceptance. These markets include, but are not limited to, social media and marketing applications, on-site unattended location specific real estate marketing (homes or commercial), demographic collection (conventions, malls etc), personal guidance and instruction (museums, large buildings or even efficient shopping paths), unattended location-based sales and marketing (impulse, specials, e-coupons), location specific click-through information and advertising, along with all the existing current server aware markets.

While the foregoing written description of the invention enables a person of ordinary but technically aware skill to make and use the invention in what is considered to be the best mode at present, a person of ordinary skill will understand and appreciate the existence of combinations and variants, or their equivalents of the specific embodiment, method, and examples contained herein. The present invention should therefore not be limited by the above described embodiment and examples or methods, but by all embodiments and methods within the scope and spirit of the invention.

What is claimed is:

1. A method of implementing asynchronously-clocked fixed-location devices for a distance determination by a roaming client device, the method comprises the steps of:
    (A) providing a master device and an at least one slave device, wherein said slave device is separated from said master device by a constant distance;
    (B) providing an at least one client device located in between or around said master device and said slave device;
    (C) transmitting a series of pulses from said master device, wherein said series of pulses is transmitted at a predetermined interval;
    (D) initiating a counter for said client device, once said client device receives a first pulse from said master device;
    (E) incrementing said counter as said client device receives each subsequent pulse from said master device;
    (F) transmitting an acknowledgement pulse from said slave device, once said first pulse is received by said slave device;
    (G) recording an actual value of said counter, once said client device receives said acknowledgement pulse from said slave device; and
    (H) calculating a time difference of arrival (TDOA) at said client device, wherein said TDOA is for said master device and said slave device.

2. The method of implementing asynchronously-clocked fixed-location devices for a distance determination by a roaming client device, wherein the method of calculating said TDOA as claimed in claim 1 comprises the steps of:
    providing said client device is aware of said constant distance between said master device and said slave device;
    providing said client device is aware of said predetermined interval of said series of pulses;
    proportionately calculating a signal distance from both said actual value of said counter and said predetermined interval, wherein said signal distance is defined as a length from said master device to said slave device and then to said client device; and
    calculating said TDOA with said client device by subtracting said constant distance from said signal distance.

3. The method of implementing asynchronously-clocked fixed-location devices for a distance determination by a roaming client device, wherein the method of transmitting said acknowledgement pulse and calculating said TDOA as claimed in claim 1 comprises the steps of:
    delaying transmission of said acknowledgement pulse, once said first pulse is received by said slave device;
    synchronizing said slave device to said master device as said slave device receives a set number of subsequent pulses from said master slave;
    transmitting said acknowledgment pulse from said slave device, after said slave device receives said set number of subsequent pulses;
    providing said client device is aware of said set number of subsequent pulses; and
    subtracting said set number of subsequent pulses from an observed value of said counter in order to determine said actual value of said counter.

4. The method of implementing asynchronously-clocked fixed-location devices for a distance determination by a roaming client device, the method as claimed in claim 1 comprises the steps of:
    providing a first slave device and a second slave device as said at least one slave device;
    uniquely identifying said acknowledgement pulse from said first slave device and said acknowledgement pulse from said second slave device with said client device; and
    separately recording said actual value of said counter for said first slave device and said actual valve of said counter for said second slave device.

5. The method of implementing asynchronously-clocked fixed-location devices for a distance determination by a roaming client device, the method as claimed in claim 1 further comprises the step of:
    terminating transmission of said series of pulses from said master device, once said master device receives said acknowledgement pulse from each of said at least one slave device.

6. The method of implementing asynchronously-clocked fixed-location devices for a distance determination by a roaming client device, the method as claimed in claim 1 further comprises the steps of:
    cyclically repeating said steps (C) through (H) as a plurality of passes, wherein said plurality of passes includes a first pass and an at least one subsequent pass;
    phase-incrementing said acknowledgement pulse with said slave device during each of said at least one subsequent pass; and
    averaging said signal distance for each of said plurality of passes with each other in order to determine a more accurate signal distance at a higher spatial resolution.

7. The method of implementing asynchronously-clocked fixed-location devices for a distance determination by a roaming client device, wherein the method of implementing the plurality of passes as claimed in claim 6 comprises the steps of:
    dividing 360 degrees by a total number for said plurality of passes in order to calculate a set value; and
    phase-incrementing said acknowledgement pulse by said set value during each of said at least one subsequent pass.

8. The method of implementing asynchronously-clocked fixed-location devices for a distance determination by a roaming client device, wherein the method of implementing the plurality of passes as claimed in claim 6 comprises the step of:

adjusting said predetermined interval for series of pulses in order to set a total length of time for said plurality of passes.

9. The method of implementing asynchronously-clocked fixed-location devices for a distance determination by a roaming client device, wherein the method of implementing the plurality of passes as claimed in claim 6 comprises the step of:

providing said client device with an accumulator for each of said at least one slave device;

incrementing said accumulator to said actual value of said counter during said first pass, once said client device receives said acknowledgement pulse from said slave device;

resetting said counter for said client device after said first pass;

incrementing said accumulator to said actual value of said counter during said subsequent pass, once said client device receives said acknowledgement pulse from said slave device;

resetting said counter for said client device after each of said at least one subsequent pass; and tracking an overall count with said accumulator through both said first pass and said additional pass.

\* \* \* \* \*